US012717623B1

(12) United States Patent
Schmitt et al.

(10) Patent No.: US 12,717,623 B1
(45) Date of Patent: Aug. 25, 2026

(54) SYSTEMS FOR AND METHODS OF CONTEXT-PRESERVING AGENT ROUTING WITH THREAD-LEVEL CONTEXT SERIALIZATION

(71) Applicant: Longevity Strategists, Inc., Falls Church, VA (US)

(72) Inventors: Suzanne Schmitt, Summerville, SC (US); Jennifer Late, Tysons, VA (US); Tom West, Falls Church, VA (US); Eli Wood, Boulder, CO (US); Keith Pattison, Boulder, CO (US); Bobby Thompson, Austin, TX (US)

(73) Assignee: Longevity Strategists, Inc., Falls Church, VA (US)

( * ) Notice: Subject to any disclaimer, the term of this patent is extended or adjusted under 35 U.S.C. 154(b) by 0 days.

(21) Appl. No.: 19/427,038

(22) Filed: Dec. 19, 2025

(51) Int. Cl.
*G06F 9/50* (2006.01)
*H04L 51/216* (2022.01)

(52) U.S. Cl.
CPC .......... *G06F 9/5005* (2013.01); *H04L 51/216* (2022.05)

(58) Field of Classification Search
None
See application file for complete search history.

(56) References Cited

U.S. PATENT DOCUMENTS 10,469,665 B1 11/2019 Bell et al.
12,393,889 B1 8/2025 Shetty
2026/0004162 A1* 1/2026 Bhat .................... G06F 9/5005

FOREIGN PATENT DOCUMENTS

IN 202541041233 A 5/2005
IN 202511082519 A 9/2025

OTHER PUBLICATIONS

Hari Masoor Samep: A Secure Agent Memory Exchange Protocol for Persistent Context Sharing in Multi-Agent AI Systems arXiv:2507.10562v1 [cs.AI] Jul. 5, 2025.
M Haseeb Context Engineering for Multi-Agent LLM Code Assistants Using Elicit, NotebookLM, ChatGPT, and Claude Code arXiv:2508.08322v1 [cs.SE] Aug. 9, 2025.

* cited by examiner

*Primary Examiner* — Eric C Wai
(74) *Attorney, Agent, or Firm* — Caldwell LLC

(57) ABSTRACT

Systems for and methods of context-preserving agent routing with thread-level context serialization. The system includes at least a processor and a memory. The systems and methods configure the processor to receive a request associated with a conversation thread, access a thread-level context object as a function of the conversation thread, determine a routing condition for the request as a function of the thread-level context object, select, from a plurality of software agents, a first agent having a capability profile that satisfies the routing condition, provide the first agent with at least a portion of the thread-level context object, receive, from the first agent, a first result of the at least a first operation, and update the thread-level context object as a function of the first result of the at least a first operation.

18 Claims, 8 Drawing Sheets

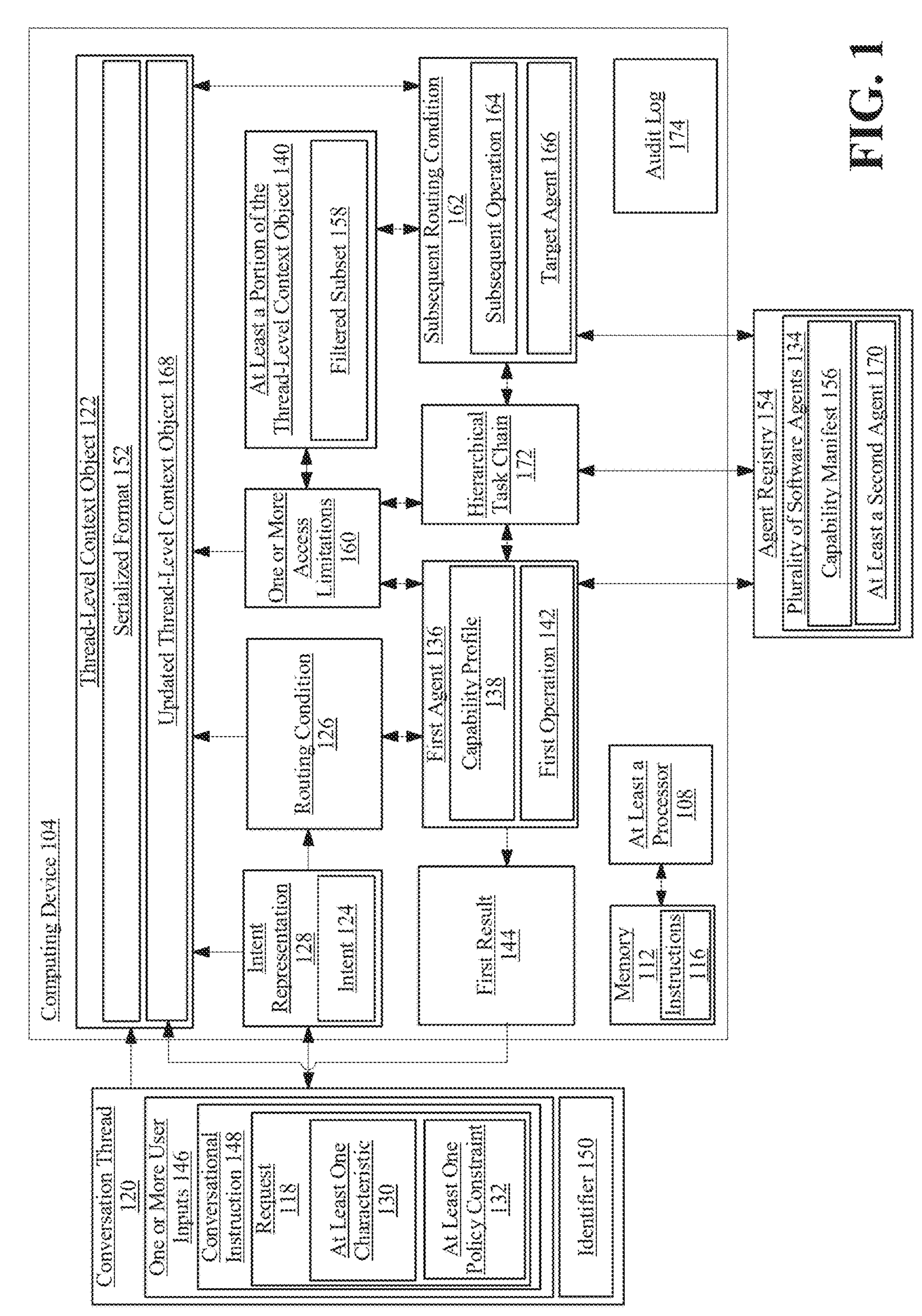
100
Computing Device 104
Thread-Level Context Object 122
Serialized Format 152
Updated Thread-Level Context Object 168
Intent Representation 128
Intent 124
Routing Condition 126
One or More Access Limitations 160
At Least a Portion of the Thread-Level Context Object 140
Filtered Subset 158
Subsequent Routing Condition 162
Subsequent Operation 164
Target Agent 166
Audit Log 174
First Result 144
First Agent 136
Capability Profile 138
First Operation 142
Hierarchical Task Chain 172
At Least a Processor 108
Memory 112
Instructions 116
Agent Registry 154
Plurality of Software Agents 134
Capability Manifest 156
At Least a Second Agent 170
Conversation Thread 120
One or More User Inputs 146
Conversational Instruction 148
Request 118
At Least One Characteristic 130
At Least One Policy Constraint 132
Identifier 150
FIG. 1

SYSTEMS FOR AND METHODS OF CONTEXT-PRESERVING AGENT ROUTING WITH THREAD-LEVEL CONTEXT SERIALIZATION

FIELD OF THE INVENTION

The present invention generally relates to the field of computer-implemented techniques for coordinating autonomous software agents. In particular, the present invention is directed to systems for and methods of context-preserving agent routing with thread-level context serialization.

BACKGROUND

Computing systems that support conversational interfaces often rely on multiple software components or agents to process user inputs, generate intermediate results, and perform follow-on computational operations. In such systems, maintaining a consistent representation of conversational state across asynchronous agent interactions presents significant technical challenges, particularly when requests must be interpreted, routed, and executed in a sequence that depends on evolving context. Existing architectures frequently treat each request in isolation, leading to fragmentation of state information, loss of intermediate computational results, and inconsistencies in downstream processing. Further complications arise when agents with different functional capabilities require access to shared state under varying access limitations, making it difficult to preserve coherent context while enforcing system-level constraints. These limitations hinder the reliability and scalability of multi-agent conversational computing environments.

SUMMARY OF THE DISCLOSURE

In some aspects, the techniques described herein relate to a system for context-preserving agent routing with thread-level context serialization, the system including at least a processor and a memory communicatively connected to the at least a processor, wherein the memory contains instructions configuring the at least a processor to: receive a request associated with a conversation thread, access a thread-level context object as a function of the conversation thread, determine a routing condition for the request as a function of the thread-level context object, wherein determining the routing condition of the request includes: generating an intent representation as a function of at least one characteristic of the request and determining the routing condition as a function of evaluating at least one policy constraint encoded in the thread-level context object against the intent representation, select, from a plurality of software agents, a first agent having a capability profile that satisfies the routing condition, provide the first agent with at least a portion of the thread-level context object, wherein the first agent is configured to perform at least a first operation as a function of the request, receive, from the first agent, a first result of the at least a first operation, and update the thread-level context object as a function of the first result of the at least a first operation.

In some aspects, the techniques described herein relate to a method of context-preserving agent routing with thread-level context serialization, the method including: receiving, by at least a processor, a request associated with a conversation thread, accessing, using the at least a processor, a thread-level context object as a function of the conversation thread, determining, using the at least a processor, a routing condition for the request as a function of the thread-level context object, wherein determining the routing condition of the request includes: generating an intent representation as a function of at least one characteristic of the request and determining the routing condition as a function of evaluating at least one policy constraint encoded in the thread-level context object against the intent representation, selecting, using the at least a processor and from a plurality of software agents, a first agent having a capability profile that satisfies the routing condition; providing, using the at least a processor, the first agent with at least a portion of the thread-level context object, wherein the first agent is configured to perform at least a first operation as a function of the request, receiving, by at least the processor and from the first agent, a first result of the at least a first operation, and updating, using the at least a processor, the thread-level context object as a function of the first result of the at least a first operation.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 1 is a block diagram of an exemplary system for context-preserving agent routing with thread-level context serialization;

Figure 2:
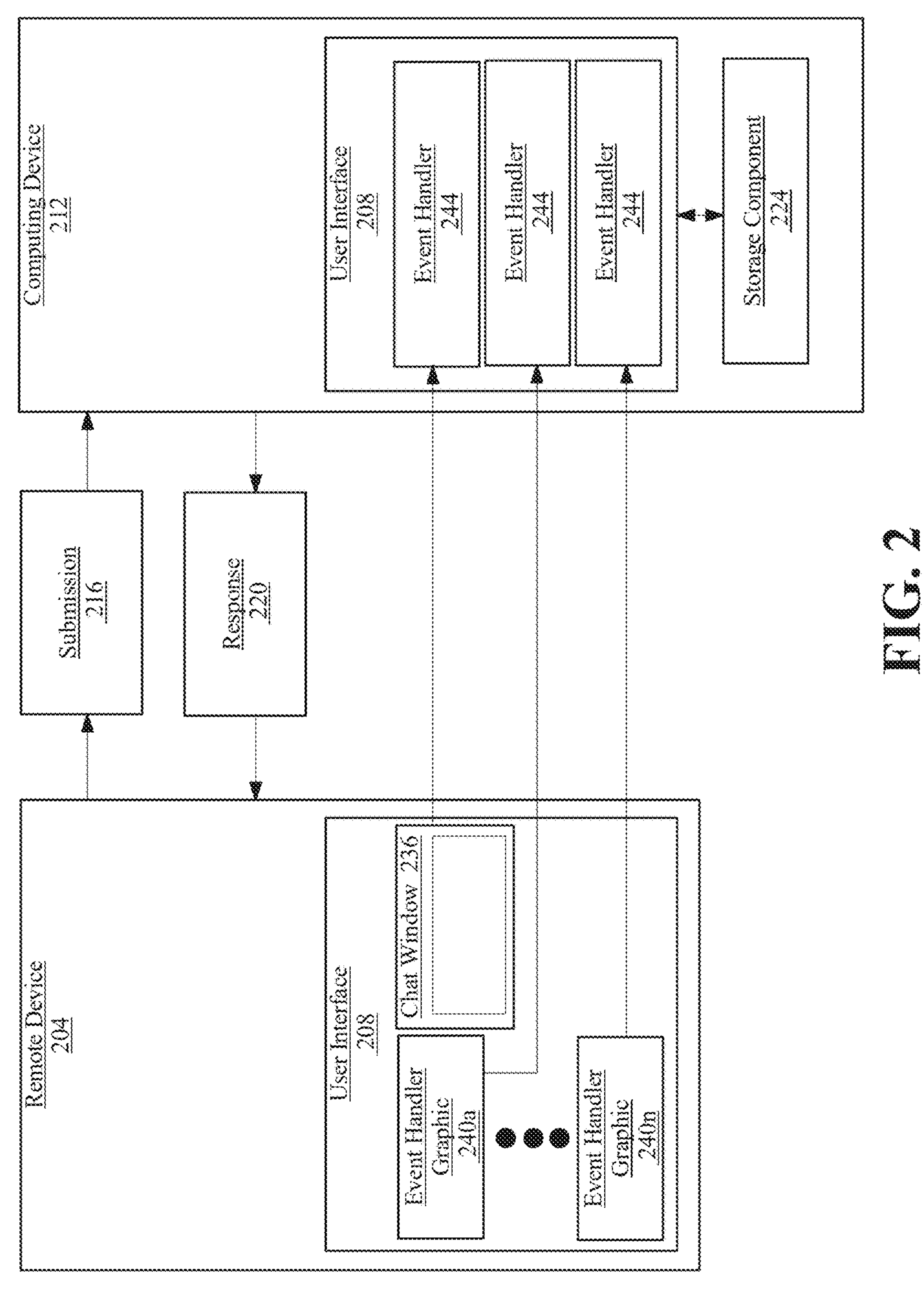
FIG. 2 is a schematic illustration of a user interface system.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for context-preserving routing of computational operations among multiple software agents within a conversational computing environment. In an embodiment, the system maintains a thread-level context object that persists across asynchronous operations and enables agents to interpret, process, and generate follow-on tasks without loss of state.

Aspects of the present disclosure can be used to coordinate heterogeneous software agents that contribute to the processing of a single conversational request while maintaining a coherent computational context across agent boundaries. Aspects of the present disclosure can also be used to enforce access limitations, policy constraints, or capability-based routing conditions as operations move between agents. This is so, at least in part, because the disclosed systems serialize and update a shared context object that encodes conversational state, intent information, task dependencies, and policy metadata, thereby allowing routing logic to evaluate which agent is best suited to perform each operation.

Aspects of the present disclosure allow for multiple autonomous software agents to generate, exchange, and execute tasks while referencing a common context object that is continuously updated as work progresses. Exemplary embodiments illustrating aspects of the present disclosure are described below in the context of several specific examples.

Embodiments of the he disclosed system can be used within an application where users provide natural-language inputs while interacting with dynamic digital workspaces such as canvases, protocols, or journey templates. A chatbot component may index relevant information and prepare summaries, and chat-based inputs may trigger creation or assignment of tasks. The system can employ a multi-agent orchestration pattern in which a routing service directs a request to a selected agent and subsequently routes follow-on operations to the same or different agents while preserving continuity of the conversation thread. Agents may generate tasks for one another, operate under capability- or policy-based scopes, and access a shared context bundle that prevents loss of information during handoff. A chat-integrated panel may display the active agent, planned steps, and routing history, while an audit mechanism records which agent acted on which portion of context to support verification within environments that require strong privacy or professional-protocol guarantees.

The technical solution provided by the various embodiments and aspects of the present disclosure, in one or more embodiments, centers on a routing architecture that maintains and propagates a serialized, thread-level context object across multiple software agents participating in a conversational workflow. The system may interpret user inputs, generate intent representations, evaluate policy constraints, and select an appropriate agent based on the combined context and agent-capability information. As agents perform operations, the system may receive results, update the context object, and determine whether subsequent operations should be routed to the same or a different agent. Advantageously, this continuous context-preserving mechanism enables deterministic multi-agent task execution, supports hierarchical task chains, and ensures that all agents operate on a consistent and policy-compliant representation of conversational state.

Referring now to FIG. 1, an exemplary embodiment of system 100 for context-preserving agent routing with thread-level context serialization is illustrated. For purposes of this disclosure, "context-preserving agent routing" is a process in which a computing system selects one or more software agents to perform operations associated with a conversational request while maintaining a consistent, thread-level context object 122 that is accessible to each selected agent. In an embodiment, the routing decision may be based, at least in part, on intent information, capability profiles of candidate agents, and/or policy constraints encoded in the context object. As operations progress, results produced by agents may be merged back into the context object so that subsequent routing decisions and agent operations reference an updated and coherent representation of conversational state. For purposes of this disclosure, "thread-level context serialization" is a process in which state information associated with a conversation thread 120 is encoded into a structured representation that can be stored, transmitted, and reconstructed by a computing system. In some embodiments, thread-level context serialization may include converting a thread-level context object 122, including intent information, intermediate results, task metadata, and policy constraints, into a serialized format 152 suitable for persistence in memory or a data store and for transfer between software agents. Upon deserialization, the system can reconstruct the thread-level context object 122 so that subsequent operations 164, including routing decisions and agent executions, are performed using a coherent and up-to-date representation of the conversation thread's state.

In continued reference to FIG. 1, system 100 may include circuitry such as without limitation a processor communicatively connected to a memory; for instance, circuitry may include and/or be included in a computing device. As used in this disclosure, "communicatively connected" means connected by way of a connection, attachment, or linkage between two or more relata such as without limitation electronic components, modules, and/or devices which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals there between may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

Circuitry may alternatively or additionally be implemented by configuring a hardware device such as a combinatorial or sequential logic circuit, an application-specific integrated circuit (ASIC), a field-programmable gate array (FPGA), or other hardware unit; memory may be attached thereto to further configure the hardware unit using read-only memory (ROM) or any other static or writable memory as described in this disclosure. Alternatively or additionally, hardware units and/or modules may be combined with and/or in communication with a processor, such as without limitation in a system-on-chip architecture wherein some functions are configured by modification or design of hardware circuitry, such as without limitation FPGA circuitry, while others are configured in the form of instructions in memory for one or more processors. As a non-limiting example, any step or combination of steps described herein may be performed entirely using hardware circuit configured to perform such steps either with static memory or rewritable memory. Such steps or combinations of steps may include signing with a digital signature, cryptographically hashing, evaluation of zero-knowledge proofs, or any other specific process described in this disclosure.

With continued reference to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, in an embodiment, at least a processor 108 may execute a conversational interaction layer that provides a chatbot interface through which a user may submit natural-language inputs. For purposes of this disclosure, a "chatbot interface" is a software-implemented communication surface that enables interaction between a user and one or more software agents. This interaction may include interactions through text-based, voice-based, and/or multimodal messaging channels. In some embodiments, the chatbot interface may be presented as a chat panel integrated into a broader advisor workspace, such as a family canvas, protocol execution environment, and/or journey-template interface. In some cases, the chatbot interface may be rendered on a display device communicatively connected to at least a processor 108 and may support interactive features such as message threading, context-aware suggestions, protocol-linked acti ons, and inline task creation. In some embodiments, the chatbot interface may function as the primary entry point for user instructions, operational queries, and/or workflow-related commands. As non-limiting examples, a user may input conversational instructions 148 such as "Has the client finished the risk assessment?," "Create a follow-up task for the onboarding specialist," or "Prepare a brief summarizing today's updates." In an embodiment, the chatbot interface may further permit a user to reference entities, tasks, or records within the advisor environment by name or by contextual shorthand (e.g., "Check on that task"). The interface may additionally, in some cases, display responses generated by agents, including summaries, retrieved data, task confirmations, and reasoning statements provided by one or more agent models.

In further reference to FIG. 1, in certain embodiments, the chatbot interface may maintain a visual representation of the active agent handling the current request 118, the sequence of prior agent handoffs, and/or selectable planned next steps that have been inferred or generated by the routing engine. For example, the interface may display an "active agent indicator" showing which agent is processing the current operation, a "handoff history" panel depicting the chain of agents that have acted on the conversation thread 120, and/or a "planned steps" region displaying anticipated downstream tasks. These interface elements may be dynamically updated as the system receives results from agents, updates the thread-level context object 122, and computes subsequent routing conditions 162. In some embodiments, the chatbot interface may be communicatively connected to a message-processing module configured to transform unstructured user inputs into machine-interpretable representations. Further, in some cases, the chatbot may tokenize, classify, and/or embed the conversational instruction 148 using language models, intent classifiers, or command-parsing logic. The resulting intermediate representation may then be forwarded to downstream modules, including the request-extraction module, the routing engine, and the agent registry 154, for subsequent processing. In certain embodiments, the chatbot interface may also transmit metadata alongside the user's input, including the conversation thread identifier 150, UI context, user identity, and domain-specific environmental data. This metadata may support accurate alignment between the conversational instruction 148 and the correct thread-level context object 122.

In continued reference to FIG. 1, in additional embodiments, the chatbot interface may support bi-directional synchronization with underlying workflow components of the advisor platform. For example, the chatbot may surface task lists, protocol status indicators, and/or client-record summaries directly within the chat panel and may allow users to issue commands that modify these artifacts. Conversely, agents acting outside the chat interface may generate messages or summaries that appear within the chatbot, thereby enabling a unified conversational representation of system activity. This integration may allow the chatbot interface to serve as both an input mechanism and an ambient intelligence display, offering context continuity across all operations performed within the conversation thread 120.

Still referring to FIG. 1, in an embodiment, the chatbot interface and associated conversational interaction layer may generate one or more intermediate data structures representing the user's input, contextual metadata, and/or system-triggered conversational events. These intermediate structures may be transmitted to one or more processing modules executed by at least a processor 108, which may include request-parsing logic, intent-detection models, and/or routing-condition evaluators. In certain embodiments, the chatbot interface may act solely as the interaction surface, while the underlying processor is responsible for receiving the resulting request object, aligning it with the appropriate conversation thread 120, and initiating the multi-agent orchestration flow described herein. Accordingly, the processor's role in receiving a request 118 associated with a conversation thread 120 may begin only after the chatbot interface or upstream monitoring components have produced a machine-interpretable representation of the user's conversational instruction 148.

With further reference to FIG. 1, in an embodiment, at least a processor 108 may be configured to receive a request 118 associated with a conversation thread 120. For purposes of this disclosure, a "request" is a representation of an instruction, query, or operation expressed within a conversational computing environment. By way of example and without limitation, a request 118 may include a natural-language utterance entered into a chat interface, a programmatically generated instruction issued by another software agent, and/or an event generated by a system component that conveys an action to be performed. In various embodiments, a request 118 may originate from or pertain to the output of another agent, including a task handed off for further processing, an intermediate result requiring additional computation, or a dependency created during multi-agent coordination. For purposes of this disclosure, a "conversation thread" is a logical sequence of related inputs, outputs, and intermediate operations maintained for a particular interactive session. In an embodiment, a conversation thread 120 may include elements of a sequence that share a common thread identifier or other association marker. In some cases, the conversation thread 120 may provide the structural boundary within which the system maintains a thread-level context object 122, such that receiving the request 118 enables at least a processor 108 to align subsequent processing and routing operations with the appropriate conversational context. In various embodiments, a conversation thread 120 may be instantiated within a dedicated chat interface, a collapsible side panel embedded within another application, or a persistent interaction channel that a user may leave and later return to. In certain embodiments, a conversation thread 120 may span multiple user sessions or devices, provided that the system maintains continuity through the associated thread identifier 150 and corresponding context object.

In further reference to FIG. 1, in some embodiments, receiving the request 118 associated with the conversation thread 120 may include obtaining the request 118 from an upstream processing component configured to observe or participate in the conversational workflow. For example, a software agent dedicated to monitoring conversational activity or tracking intermediate task execution may generate a structured request and transmit the request 118 to at least a processor 108 through an inter-agent communication channel, message bus, or routing interface. In other embodiments, the request 118 may be received from a system component responsible for normalizing user inputs, aggregating partial results, and/or handling protocol-specific triggers generated during interaction with the application. In such cases, at least a processor 108 may receive the request 118 in a pre-processed or partially interpreted form, enabling the system to incorporate the request 118 into the conversation thread 120 and initiate routing operations without requiring direct analysis of the raw input that produced the request 118.

Still referring to FIG. 1, in additional embodiments, receiving the request 118 may include accepting the request 118 as part of an event-driven dispatch initiated by another component of the system. For instance, a conversational orchestration layer, routing pre-processor, and/or task-management subsystem may emit an event indicating that a new request has been created or that an existing operation has advanced to a stage requiring agent involvement. In such implementations, the request 118 may be delivered to at least a processor 108 through an event queue, callback interface, and/or asynchronous message channel, thereby allowing the system to decouple request origination from request handling. This arrangement may enable at least a processor 108 to receive requests 118 that arise from background processes, automated workflows, or prior agent computations while still maintaining alignment with the active conversation thread 120 and its corresponding thread-level context object 122.

In yet other embodiments, receiving the request 118 may include obtaining the request 118 through synchronous or asynchronous communication mechanisms that integrate with the system's conversational runtime. In some cases, at least a processor 108 may periodically poll a shared data structure or message buffer to pull newly issued requests associated with the conversation thread 120, while in other cases a push-based mechanism may deliver the request 118 directly to at least a processor 108 as soon as it is generated. In further embodiments, multiple requests 118 may be batched and delivered together, such as when upstream components aggregate related conversational events before forwarding them for routing and processing. Regardless of the delivery mechanism, the received request 118 may retain a reference to the underlying conversation thread 120, thereby enabling at least a processor 108 to associate the request 118 with the appropriate thread-level context object 122.

With continued reference to FIG. 1, in an embodiment, receiving the request 118 associated with the conversation thread 120 may include monitoring the conversation thread 120 for one or more user inputs 146. For purposes of this disclosure, a "user input" is any data element or signal provided by a user that conveys information, intent, or interaction within a conversational computing environment. By way of example and without limitation, user inputs may include natural-language text entered into a chat field, selections made within an interactive interface element, voice utterances converted to text by an upstream speech-processing module, and/or gesture-based commands captured by an input device. In some embodiments, one or more user inputs 146 may include a modification to a workspace or application environment that triggers an implicit conversational event, such as updating a record, selecting an item, and/or interacting with a protocol or template embedded alongside the conversational interface. In an embodiment, monitoring the conversation thread 120 for user inputs may enable system 100 to observe changes in the interactive session as they occur and to identify content that may constitute a request 118 requiring subsequent processing, routing, or agent execution.

In continued reference to FIG. 1, in some embodiments, monitoring the conversation thread 120 for one or more user inputs 146 may be performed directly by at least a processor 108 executing instructions 116 stored in memory 112. In other embodiments, the monitoring may be facilitated by one or more auxiliary components communicatively connected to at least a processor 108, such as an event listener, message-stream observer, and/or conversational runtime module configured to surface new inputs as they occur. For example, a monitoring component may subscribe to a message bus or interaction log associated with the conversation thread 120 and notify at least a processor 108 when new user inputs are appended. For purposes of this disclosure, a "message bus" is any communication substrate or middleware component that transports messages, events, or data packets between system modules, agents, or services. By way of non-limiting example, a message bus may be implemented using a publish-subscribe framework, an event-streaming platform, a queue-based communication system, and/or an in-memory message dispatcher. For purposes of this disclosure, an "interaction log" is a data structure or record store that maintains a sequential history of conversational events, user inputs, agent outputs, or system-generated updates associated with a conversation thread 120. In various embodiments, the message bus or interaction log may serve as the underlying source from which at least a processor 108 or monitoring subsystem observes new user inputs or conversational activity for subsequent request processing. In certain implementations, a monitoring subsystem may continuously sample the data structures that maintain the conversation thread 120, such as a chat buffer, event queue, and/or transient message store, and relay observed user inputs to at least a processor 108 for evaluation. Regardless of the implementation details, the monitoring functionality may enable at least a processor 108 to maintain awareness of incoming user activity and to determine when a user input may correspond to a request 118 requiring downstream processing.

Still referring to FIG. 1, in an embodiment, receiving the request 118 associated with the conversation thread 120 may include detecting, from the one or more user inputs 146, the request 118, wherein the request 118 corresponds to a conversational instruction 148. For purposes of this disclosure, a "conversational instruction" is a user-provided expression that conveys an action to be performed, an operation to be initiated, or an inquiry requiring computational processing within the conversational computing environment. By way of example and without limitation, a conversational instruction 148 may include a natural-language command such as "check the client's progress," a directive embedded within a longer utterance, and/or a selection made within an interactive interface that implicitly triggers an operation relevant to the active conversation thread 120. In some embodiments, detecting the conversational instruction 148 may include evaluating textual, structural, or semantic characteristics of the user input to determine whether it conveys an actionable intent rather than incidental or non-operative content. In this manner, system 100 may be able to identify inputs that should be transformed into structured requests for subsequent routing and agent execution.

With further reference to FIG. 1, in an embodiment, detecting the request 118 may be facilitated by a language-processing module configured to analyze the content of the user input and determine whether the input conveys an actionable conversational instruction 148. Language processing module may include any hardware and/or software module. Language processing module may be configured to extract, from the one or more documents, one or more words. One or more words may include, without limitation, strings of one or more characters, including without limitation any sequence or sequences of letters, numbers, punctuation, diacritic marks, engineering symbols, geometric dimensioning and tolerancing (GD&T) symbols, chemical symbols and formulas, spaces, whitespace, and other symbols, including any symbols usable as textual data as described above. Textual data may be parsed into tokens, which may include a simple word (sequence of letters separated by whitespace) or more generally a sequence of characters as described previously. The term "token," as used herein, refers to any smaller, individual groupings of text from a larger source of text; tokens may be broken up by word, pair of words, sentence, or other delimitation. These tokens may in turn be parsed in various ways. Textual data may be parsed into words or sequences of words, which may be considered words as well. Textual data may be parsed into "n-grams", where all sequences of n consecutive characters are considered. Any or all possible sequences of tokens or words may be stored as "chains", for example for use as a Markov chain or Hidden Markov Model.

Still referring to FIG. 1, language processing module may operate to produce a language processing model. Language processing model may include a program automatically generated by computing device and/or language processing module to produce associations between one or more words extracted from at least a document and detect associations, including without limitation mathematical associations, between such words. Associations between language elements, where language elements include for purposes herein extracted words, relationships of such categories to other such term may include, without limitation, mathematical associations, including without limitation statistical correlations between any language element and any other language element and/or language elements. Statistical correlations and/or mathematical associations may include probabilistic formulas or relationships indicating, for instance, a likelihood that a given extracted word indicates a given category of semantic meaning. As a further example, statistical correlations and/or mathematical associations may include probabilistic formulas or relationships indicating a positive and/or negative association between at least an extracted word and/or a given semantic meaning; positive or negative indication may include an indication that a given document is or is not indicating a category semantic meaning. Whether a phrase, sentence, word, or other textual element in a document or corpus of documents constitutes a positive or negative indicator may be determined, in an embodiment, by mathematical associations between detected words, comparisons to phrases and/or words indicating positive and/or negative indicators that are stored in memory at computing device, or the like.

Still referring to FIG. 1, language processing module and/or diagnostic engine may generate the language processing model by any suitable method, including without limitation a natural language processing classification algorithm; language processing model may include a natural language process classification model that enumerates and/or derives statistical relationships between input terms and output terms. Algorithm to generate language processing model may include a stochastic gradient descent algorithm, which may include a method that iteratively optimizes an objective function, such as an objective function representing a statistical estimation of relationships between terms, including relationships between input terms and output terms, in the form of a sum of relationships to be estimated. In an alternative or additional approach, sequential tokens may be modeled as chains, serving as the observations in a Hidden Markov Model (HMM). HMMs as used herein are statistical models with inference algorithms that that may be applied to the models. In such models, a hidden state to be estimated may include an association between an extracted words, phrases, and/or other semantic units. There may be a finite number of categories to which an extracted word may pertain; an HMM inference algorithm, such as the forward-backward algorithm or the Viterbi algorithm, may be used to estimate the most likely discrete state given a word or sequence of words. Language processing module may combine two or more approaches. For instance, and without limitation, machine-learning program may use a combination of Naive-Bayes (NB), Stochastic Gradient Descent (SGD), and parameter grid-searching classification techniques; the result may include a classification algorithm that returns ranked associations.

Alternatively, or additionally, and with continued reference to FIG. 1, language processing module may be produced using one or more large language models (LLMs). A "large language model," as used herein, is a deep learning data structure that can recognize, summarize, translate, predict and/or generate text and other content based on knowledge gained from massive datasets. Large language models may be trained on large sets of data. Training sets may be drawn from diverse sets of data such as, as non-limiting examples, novels, blog posts, articles, emails, unstructured data, electronic records, and the like. In some embodiments, training sets may include a variety of subject matter relevant to conversational workflows and multi-agent coordination, such as, as non-limiting examples, historical chat transcripts, task descriptions, protocol or template definitions, interaction logs, agent-generated summaries, workflow records, system event traces, and other unstructured or semi-structured data associated with conversational computing environments. In some embodiments, training sets of an LLM may include information from one or more public or private databases that store operational content, user interaction histories, task progression states, or domain-specific procedural documents. As a non-limiting example, training sets may include data sources maintained by an entity, including workspace records, advisor notes, protocol step descriptions, or anonymized workflow examples used to illustrate how instructions map to downstream agent operations. In some embodiments, training sets may further include portions of documents associated with conversational interactions and their corresponding system-interpreted outputs, enabling the LLM to learn mappings between natural-language instructions, inferred intents, and agent-processable request structures. In an embodiment, an LLM may include one or more architectures based on capability requirements of an LLM. Exemplary architectures may include, without limitation, GPT (Generative Pre-trained Transformer), BERT (Bidirectional Encoder Representations from Transformers), T5 (Text-To-Text Transfer Transformer), and the like. Architecture choice may depend on a needed capability such generative, contextual, or other specific capabilities.

With continued reference to FIG. 1, in some embodiments, an LLM may be generally trained. As used in this disclosure, a "generally trained" LLM is an LLM that is trained on a general training set comprising a variety of subject matters, data sets, and fields. In some embodiments, an LLM may be initially generally trained. Additionally, or alternatively, an LLM may be specifically trained. As used in this disclosure, a "specifically trained" LLM is an LLM that is trained on a specific training set, wherein the specific training set includes data including specific correlations for the LLM to learn. As a non-limiting example, an LLM may be generally trained on a general training set, then specifically trained on a specific training set. In an embodiment, specific training of an LLM may be performed using a supervised machine learning process. In some embodiments, generally training an LLM may be performed using an unsupervised machine learning process. As a non-limiting example, specific training set may include information from a database. As a non-limiting example, specific training set may include text related to the users such as user specific data for electronic records correlated to examples of outputs. In an embodiment, training one or more machine learning models may include setting the parameters of the one or more models (weights and biases) either randomly or using a pretrained model. Generally training one or more machine learning models on a large corpus of text data can provide a starting point for fine-tuning on a specific task. A model such as an LLM may learn by adjusting its parameters during the training process to minimize a defined loss function, which measures the difference between predicted outputs and ground truth. Once a model has been generally trained, the model may then be specifically trained to fine-tune the pretrained model on task-specific data to adapt it to the target task. Fine-tuning may involve training a model with task-specific training data, adjusting the model's weights to optimize performance for the particular task. In some cases, this may include optimizing the model's performance by fine-tuning hyperparameters such as learning rate, batch size, and regularization. Hyperparameter tuning may help in achieving the best performance and convergence during training. In an embodiment, fine-tuning a pretrained model such as an LLM may include fine-tuning the pretrained model using Low-Rank Adaptation (LoRA). As used in this disclosure, "Low-Rank Adaptation" is a training technique for large language models that modifies a subset of parameters in the model. Low-Rank Adaptation may be configured to make the training process more computationally efficient by avoiding a need to train an entire model from scratch. In an exemplary embodiment, a subset of parameters that are updated may include parameters that are associated with a specific task or domain.

With continued reference to FIG. 1, in some embodiments an LLM may include and/or be produced using Generative Pretrained Transformer (GPT), GPT-2, GPT-3, GPT-4, and the like. GPT, GPT-2, GPT-3, GPT-3.5, and GPT-4 are products of Open AI Inc., of San Francisco, CA. An LLM may include a text prediction based algorithm configured to receive an article and apply a probability distribution to the words already typed in a sentence to work out the most likely word to come next in augmented articles. For example, if a user types the partial phrase "check the status of," an LLM may determine, based on learned conversational patterns, that terms such as "the assessment," "the task," or "the client record" are highly probable continuations. An LLM may output such predictions by ranking candidate completions according to likelihood or other prompt-dependent scoring parameters. For the example given above, the LLM may score "the assessment" as most likely, "the task" as next most likely, and "the client record" as another plausible continuation. Such predictive capabilities may allow the LLM to generate or refine intent representations 128 associated with the conversational instruction 148. An LLM may include an encoder component and a decoder component.

Still referring to FIG. 1, an LLM may include a transformer architecture. In some embodiments, encoder component of an LLM may include transformer architecture. A "transformer architecture," for the purposes of this disclosure is a neural network architecture that uses self-attention and positional encoding. Transformer architecture may be designed to process sequential input data, such as natural language, with applications towards tasks such as translation and text summarization. Transformer architecture may process the entire input all at once. "Positional encoding," for the purposes of this disclosure, refers to a data processing technique that encodes the location or position of an entity in a sequence. In some embodiments, each position in the sequence may be assigned a unique representation. In some embodiments, positional encoding may include mapping each position in the sequence to a position vector. In some embodiments, trigonometric functions, such as sine and cosine, may be used to determine the values in the position vector. In some embodiments, position vectors for a plurality of positions in a sequence may be assembled into a position matrix, wherein each row of position matrix may represent a position in the sequence.

With continued reference to FIG. 1, an LLM and/or transformer architecture may include an attention mechanism. An "attention mechanism," as used herein, is a part of a neural architecture that enables a system to dynamically quantify the relevant features of the input data. In the case of natural language processing, input data may be a sequence of textual elements. It may be applied directly to the raw input or to its higher-level representation.

With continued reference to FIG. 1, attention mechanism may represent an improvement over a limitation of an encoder-decoder model. An encoder-decider model encodes an input sequence to one fixed length vector from which the output is decoded at each time step. This issue may be seen as a problem when decoding long sequences because it may make it difficult for the neural network to cope with long sentences, such as those that are longer than the sentences in the training corpus. Applying an attention mechanism, an LLM may predict the next word by searching for a set of positions in a source sentence where the most relevant information is concentrated. An LLM may then predict the next word based on context vectors associated with these source positions and all the previously generated target words, such as textual data of a dictionary correlated to a prompt in a training data set. A "context vector," as used herein, are fixed-length vector representations useful for document retrieval and word sense disambiguation.

Still referring to FIG. 1, attention mechanism may include, without limitation, generalized attention self-attention, multi-head attention, additive attention, global attention, and the like. In generalized attention, when a sequence of words or an image is fed to an LLM, it may verify each element of the input sequence and compare it against the output sequence. Each iteration may involve the mechanism's encoder capturing the input sequence and comparing it with each element of the decoder's sequence. From the comparison scores, the mechanism may then select the words or parts of the image that it needs to pay attention to. In self-attention, an LLM may pick up particular parts at different positions in the input sequence and over time compute an initial composition of the output sequence. In multi-head attention, an LLM may include a transformer model of an attention mechanism. Attention mechanisms, as described above, may provide context for any position in the input sequence. For example, if the input data is a natural language sentence, the transformer does not have to process one word at a time. In multi-head attention, computations by an LLM may be repeated over several iterations, each computation may form parallel layers known as attention heads. Each separate head may independently pass the input sequence and corresponding output sequence element through a separate head. A final attention score may be produced by combining attention scores at each head so that every nuance of the input sequence is taken into consideration. In additive attention (Bahdanau attention mechanism), an LLM may make use of attention alignment scores based on a number of factors. Alignment scores may be calculated at different points in a neural network, and/or at different stages represented by discrete neural networks. Source or input sequence words are correlated with target or output sequence words but not to an exact degree. This correlation may take into account all hidden states and the final alignment score is the summation of the matrix of alignment scores. In global attention (Luong mechanism), in situations where neural machine translations are required, an LLM may either attend to all source words or predict the target sentence, thereby attending to a smaller subset of words.

With continued reference to FIG. 1, multi-headed attention in encoder may apply a specific attention mechanism called self-attention. Self-attention allows models such as an LLM or components thereof to associate each word in the input, to other words. As a non-limiting example, an LLM may learn to associate the phrase "check the status" with terms such as "of the assessment," "of the task," or "of the client record," and may further learn that phrases structured in this manner commonly correspond to a request 118 requiring retrieval of workflow information or initiation of a downstream computational operation. In some embodiments, to achieve self-attention, input may be fed into three distinct fully connected neural network layers to create query, key, and value vectors. A query vector may include an entity's learned representation for comparison to determine attention score. A key vector may include an entity's learned representation for determining the entity's relevance and attention weight. A value vector may include data used to generate output representations. Query, key, and value vectors may be fed through a linear layer; then, the query and key vectors may be multiplied using dot product matrix multiplication in order to produce a score matrix. The score matrix may determine the amount of focus for a word should be put on other words (thus, each word may be a score that corresponds to other words in the time-step). The values in score matrix may be scaled down. As a non-limiting example, score matrix may be divided by the square root of the dimension of the query and key vectors. In some embodiments, the softmax of the scaled scores in score matrix may be taken. The output of this softmax function may be called the attention weights. Attention weights may be multiplied by your value vector to obtain an output vector. The output vector may then be fed through a final linear layer.

Still referencing FIG. 1, in order to use self-attention in a multi-headed attention computation, query, key, and value may be split into N vectors before applying self-attention. Each self-attention process may be called a "head." Each head may produce an output vector and each output vector from each head may be concatenated into a single vector. This single vector may then be fed through the final linear layer discussed above. In theory, each head can learn something different from the input, therefore giving the encoder model more representation power.

With continued reference to FIG. 1, encoder of transformer may include a residual connection. Residual connection may include adding the output from multi-headed attention to the positional input embedding. In some embodiments, the output from residual connection may go through a layer normalization. In some embodiments, the normalized residual output may be projected through a pointwise feed-forward network for further processing. The pointwise feed-forward network may include a couple of linear layers with a ReLU activation in between. The output may then be added to the input of the pointwise feed-forward network and further normalized.

Continuing to refer to FIG. 1, transformer architecture may include a decoder. Decoder may a multi-headed attention layer, a pointwise feed-forward layer, one or more residual connections, and layer normalization (particularly after each sub-layer), as discussed in more detail above. In some embodiments, decoder may include two multi-headed attention layers. In some embodiments, decoder may be autoregressive. For the purposes of this disclosure, "autoregressive" means that the decoder takes in a list of previous outputs as inputs along with encoder outputs containing attention information from the input.

With further reference to FIG. 1, in some embodiments, input to decoder may go through an embedding layer and positional encoding layer in order to obtain positional embeddings. Decoder may include a first multi-headed attention layer, wherein the first multi-headed attention layer may receive positional embeddings.

With continued reference to FIG. 1, first multi-headed attention layer may be configured to not condition to future tokens. As a non-limiting example, when computing attention scores on the word "am," decoder should not have access to the word "fine" in "I am fine," because that word is a future word that was generated after. The word "am" should only have access to itself and the words before it. In some embodiments, this may be accomplished by implementing a look-ahead mask. Look ahead mask is a matrix of the same dimensions as the scaled attention score matrix that is filled with "0s" and negative infinities. For example, the top right triangle portion of look-ahead mask may be filled with negative infinities. Look-ahead mask may be added to scaled attention score matrix to obtain a masked score matrix. Masked score matrix may include scaled attention scores in the lower-left triangle of the matrix and negative infinities in the upper-right triangle of the matrix. Then, when the softmax of this matrix is taken, the negative infinities will be zeroed out; this leaves zero attention scores for "future tokens."

Still referring to FIG. 1, second multi-headed attention layer may use encoder outputs as queries and keys and the outputs from the first multi-headed attention layer as values. This process matches the encoder's input to the decoder's input, allowing the decoder to decide which encoder input is relevant to put a focus on. The output from second multi-headed attention layer may be fed through a pointwise feedforward layer for further processing.

With continued reference to FIG. 1, the output of the pointwise feedforward layer may be fed through a final linear layer. This final linear layer may act as a classifier. This classifier may be as big as the number of classes that you have. For example, if you have 10,000 classes for 10,000 words, the output of that classifier will be of size 10,000. The output of this classifier may be fed into a softmax layer which may serve to produce probability scores between zero and one. The index may be taken of the highest probability score in order to determine a predicted word.

Still referring to FIG. 1, decoder may take this output and add it to the decoder inputs. Decoder may continue decoding until a token is predicted. Decoder may stop decoding once it predicts an end token.

Continuing to refer to FIG. 1, in some embodiment, decoder may be stacked N layers high, with each layer taking in inputs from the encoder and layers before it. Stacking layers may allow an LLM to learn to extract and focus on different combinations of attention from its attention heads.

With continued reference to FIG. 1, an LLM may receive an input. Input may include a string of one or more characters. Inputs may additionally include unstructured data. For example, input may include one or more words, a sentence, a paragraph, a thought, a query, and the like. A "query" for the purposes of the disclosure is a string of characters that poses a question. In some embodiments, input may be received from a user device. User device may be any computing device that is used by a user. As non-limiting examples, user device may include desktops, laptops, smartphones, tablets, and the like. In some embodiments, input may include any set of data associated with a conversational instruction 148 relevant to the multi-agent workflow, such as a partially typed request 118 to "check the status of the assessment," a natural-language instruction invoking a protocol step, or a task-related update generated by another software agent operating within the same conversation thread 120.

With continued reference to FIG. 1, an LLM may generate at least one annotation as an output. At least one annotation may be any annotation as described herein. In some embodiments, an LLM may include multiple sets of transformer architecture as described above. Output may include a textual output. A "textual output," for the purposes of this disclosure is an output comprising a string of one or more characters. Textual output may include, for example, a plurality of annotations for unstructured data. In some embodiments, textual output may include a phrase or sentence identifying the status of a user query. In some embodiments, textual output may include a sentence or plurality of sentences describing a response to a user query. As a non-limiting example, this may include restrictions, timing, advice, dangers, benefits, and the like.

Continuing to refer to FIG. 1, generating language processing model may include generating a vector space, which may be a collection of vectors, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each vector in an n-dimensional vector space may be represented by an n-tuple of numerical values. Each unique extracted word and/or language element as described above may be represented by a vector of the vector space. In an embodiment, each unique extracted and/or other language element may be represented by a dimension of vector space; as a non-limiting example, each element of a vector may include a number representing an enumeration of co-occurrences of the word and/or language element represented by the vector with another word and/or language element. Vectors may be normalized, scaled according to relative frequencies of appearance and/or file sizes. In an embodiment associating language elements to one another as described above may include computing a degree of vector similarity between a vector representing each language element and a vector representing another language element; vector similarity may be measured according to any norm for proximity and/or similarity of two vectors, including without limitation cosine similarity, which measures the similarity of two vectors by evaluating the cosine of the angle between the vectors, which can be computed using a dot product of the two vectors divided by the lengths of the two vectors. Degree of similarity may include any other geometric measure of distance between vectors.

Still referring to FIG. 1, language processing module may use a corpus of documents to generate associations between language elements in a language processing module, and diagnostic engine may then use such associations to analyze words extracted from one or more documents and determine that the one or more documents indicate significance of a category. In an embodiment, language module and/or computing device 104 may perform this analysis using a selected set of significant documents, such as documents identified by one or more experts as representing good information; experts may identify or enter such documents via graphical user interface, or may communicate identities of significant documents according to any other suitable method of electronic communication, or by providing such identity to other persons who may enter such identifications into computing device 104. Documents may be entered into a computing device by being uploaded by an expert or other persons using, without limitation, file transfer protocol (FTP) or other suitable methods for transmission and/or upload of documents; alternatively or additionally, where a document is identified by a citation, a uniform resource identifier (URI), uniform resource locator (URL) or other datum permitting unambiguous identification of the document, diagnostic engine may automatically obtain the document using such an identifier, for instance by submitting a request 118 to a database or compendium of documents such as JSTOR as provided by Ithaka Harbors, Inc. of New York.

In further reference to FIG. 1, in an embodiment, receiving the request 118 associated with the conversation thread 120 may include extracting the request 118 for routing to the first agent 136. For purposes of the present disclosure, an "agent" is a software-implemented computational module configured to perform one or more operations. For example such as retrieving information, executing a workflow step, generating a summary, and/or issuing a subsequent task. In an embodiment, agents may include, without limitation, natural-language analysis agents, workflow orchestration agents, compliance-evaluation agents, scheduling agents, and/or domain-specific agents tailored to particular advisor or professional tasks. For purposes of this disclosure, "routing" refers to a selection and delivery process in which a request 118 is directed to an appropriate agent. In an embodiment, the appropriate agent may be determined based on factors such as the inferred intent, the agent's capability profile 138, and one or more policy constraints encoded within the thread-level context object 122. For purposes of this disclosure, "extracting" refers to transforming or isolating the actionable portion of a user input into a machine-interpretable representation suitable for downstream processing. In some embodiments, extracting the request 118 may include converting the conversational instruction 148 into a structured data object, identifying associated parameters, and/or filtering irrelevant conversational material. In an embodiment, extracting the request 118 may enable the routing subsystem to produce an instruction format that can be reliably consumed by the first agent 136, thereby ensuring that the agent operates with the appropriate context and with a precise representation of the user's intended operation.

With continued reference to FIG. 1, in an embodiment, extracting the request 118 may include applying one or more computational parsing techniques to transform the conversational instruction 148 into a structured representation consumable by the routing subsystem. In some embodiments, extraction may involve tokenizing the input string, assigning syntactic or semantic tags to tokens, and identifying one or more operative verbs or instruction targets. In further embodiments, an LLM-based parsing module may be configured to infer task boundaries, normalize phrasing (e.g., converting "check if the assessment is done" into "query assessment status"), and map detected concepts to predefined operation types stored within a capability schema. In additional embodiments, extraction may include filtering out non-actionable conversational content, such as greetings, filler text, and/or contextually irrelevant phrases, so that the resulting object reflects only the actionable portion of the input. In this manner, the extraction process may generate a discrete, machine-usable representation of the request 118 that can be reliably evaluated for routing, compliance constraints, and downstream agent execution.

In further reference to FIG. 1, in an embodiment, extracting the request 118 may further include generating a structured data object that encapsulates the actionable content of the conversational instruction 148. Such a structured object may include, without limitation, a task identifier, an operation type, one or more arguments or parameters (e.g., a client identifier, a protocol step, or a document reference), a timestamp, and a correlation token linking the request 118 to the conversation thread 120. In some embodiments, the structured object may be organized as a command envelope or task object encoded in a machine-readable format such as JSON, Protobuf, or a domain-specific schema defined by the system. In further embodiments, the structured request may include metadata derived from the thread-level context object 122, allowing the request 118 to maintain continuity with ongoing agent workflows. In some cases, the structured request object may then be passed to the routing subsystem for capability matching, policy constraint evaluation, and delivery to the appropriate agent. In some embodiments, extracting the request 118 may optionally involve applying one or more linguistic or semantic parsing techniques to identify the operation type indicated by the conversational instruction 148. A parsing component may tokenize the conversational instruction 148, identify syntactic dependencies, and/or convert the instruction into an intermediate representation such as a syntax tree or a semantic frame. In an embodiment, system 100 may use a rule-based intent classifier, an embedding-based similarity model, and/or an LLM-driven semantic interpreter to determine whether the instruction corresponds to an information-retrieval request, a workflow-modification request, a summarization request, a compliance-check request, and/or another supported operation class. These parsing techniques may allow system 100 to convert unstructured conversational inputs into an operation category that can be associated with downstream agent capabilities.

With further reference to FIG. 1, in some embodiments, extracting the request 118 may further include determining one or more parameters associated with the operation type. In an embodiment, a parameter-extraction module may identify entities such as client names, protocol identifiers, task references, document identifiers, numerical values, and/or workflow steps embedded within the conversational instruction 148. In some cases, the parameter-extraction module may incorporate named-entity recognition models, pattern-matching rules, context lookups in the thread-level context object 122, and/or embedding-based retrieval operations that match user-referenced concepts to stored entities. In certain embodiments, the module may disambiguate multiple candidate entities by consulting the conversation thread's historical state, identifying which entities are most likely to be relevant to the current instruction, and/or applying confidence scoring models to select appropriate parameters. These operations may enable system 100 to isolate the actionable components of the conversational instruction 148 and to produce a request representation with explicit, machine-usable attributes.

In continued reference to FIG. 1, in some embodiments, the parameter-extraction module may include or may communicate with one or more machine-learning models configured to receive a structured or unstructured input representation and to output one or more parameter predictions relevant to the conversational instruction 148. In an embodiment, model inputs may include tokenized text from the conversational instruction 148, contextual embeddings derived from the thread-level context object 122, and/or metadata associated with prior agent activity. In some cases, model outputs may include, without limitation, an operation type classification, a ranked list of candidate entities, probability scores for parameter relevance, and/or a fully constructed parameter set suitable for inclusion in the structured request object. In certain embodiments, the model may be trained using annotated historical interactions drawn from prior conversation threads, synthetic examples generated to simulate multi-agent workflows, and/or curated training corpora containing operational phrases common to advisor-workflow environments. Training may be accomplished using supervised learning, weak supervision, contrastive learning, and/or reinforcement-learning-from-feedback techniques, depending on system requirements. In some embodiments, the model may support continual-learning or periodic retraining, such that new workflows, newly introduced agent capabilities, and/or updated compliance protocols can be incorporated into the parameter-extraction logic without requiring system-wide reconfiguration. In this way, the parameter-extraction module may evolve over time to maintain alignment with the logic of the routing system and the domain-specific vocabulary of the deployed environment.

In further reference to FIG. 1, in some embodiments, extracting the request 118 may also include validating and/or normalizing the structured representation before it is delivered to the routing subsystem. In an embodiment, a validation routine may confirm that required parameters are present, that referenced entities exist in the thread-level context object 122, and/or that the extracted instruction does not conflict with a compliance rule or workflow constraint. In some cases, a normalization step may convert synonyms into canonical forms (e.g., "check on" to "query"), align parameter formats with a predefined schema, and/or augment the instruction with metadata derived from the context object, such as the identity of the last active agent, one or more workflow state variables, or indicators specifying execution history. In certain embodiments, this enrichment may allow the routing subsystem to more accurately evaluate the request 118 against agent capability manifests 156 and policy scopes. By performing these optional validation and normalization operations, system 100 may ensure that the extracted request 118 is stable, unambiguous, and aligned with the state of the conversation thread 120 before the routing process is initiated.

Still referring to FIG. 1, in some embodiments, extracting the request 118 may additionally include resolving ambiguity or uncertainty within the conversational instruction 148. For example, a conversational instruction 148 such as "check on that task" may require disambiguation to determine which task within the conversation thread 120 is being referenced. In such cases, the extraction module may retrieve candidate entities from the thread-level context object 122, score the candidates using an intent-matching model, and select the highest-confidence match. In some embodiments, if the module determines that multiple interpretations fall within a confidence threshold, it may generate a clarification prompt for the user or annotate the structured request object with an ambiguity flag. In further embodiments, a fallback routing logic may be employed in which ambiguous or partially extracted requests 118 are routed to a general-purpose agent configured to request clarification, perform broader context inspection, or determine the correct agent destination based on system-defined heuristics. This ambiguity resolution may ensure that the extraction process yields a valid request representation, even in conversational environments where user inputs may be incomplete, colloquial, or underspecified.

With continued reference to FIG. 1, in some embodiments, resolving ambiguity may additionally involve constructing an ambiguity profile that characterizes the conversational instruction 148 according to multiple uncertainty features. Such features may include lexical vagueness (e.g., pronouns or deictic terms such as "that," "this," or "the one we talked about"), missing referents, conflicting temporal indicators, and/or incomplete parameter sets. In an embodiment, system 100 may optionally analyze these features using a dedicated ambiguity-classification model trained to assign a confidence score for the instruction's interpretability. This classification model may incorporate contextual embeddings generated from the thread-level context object 122, thereby enabling system 100 to distinguish between ambiguous references that can be resolved through context inspection and those that require user clarification or fallback handling. In certain embodiments, ambiguity resolution may include initiating a contextual narrowing routine. Such a routine may inspect prior messages in the conversation thread 120, retrieve state variables associated with in-progress tasks, and/or examine previously generated agent outputs to identify entities most likely referenced by the ambiguous instruction. In an embodiment, the contextual narrowing routine may operate using vector similarity comparisons, rule-based scoring logic, and/or constraint checking based on workflow progression. In some cases, system 100 may maintain a short-term conversational memory that stores recently referenced entities, enabling the narrowing routine to rank candidates according to conversational recency or relevance to active subtasks.

In further reference to FIG. 1, in additional embodiments, system 100 may implement a hypothesis-generation mechanism that constructs multiple candidate interpretations of the ambiguous instruction. Each hypothesis may include a proposed operation type, one or more inferred parameters, and/or an associated confidence score. In an embodiment, system 100 may then evaluate the feasibility of each hypothesis against agent capability manifests 156, policy constraints, and/or workflow state variables encoded in the thread-level context object 122. If a single hypothesis satisfies all constraints with sufficiently high confidence, system 100 may adopt that interpretation and generate a structured request accordingly. If multiple hypotheses remain viable, system 100 may annotate the structured request object with an ambiguity-resolution token, and/or alternatively, route the request 118 to an agent configured to engage in clarification dialogs or to perform deeper introspection on the context object. In certain embodiments, ambiguity resolution may also include leveraging a learned disambiguation model trained on annotated examples of ambiguous conversational instructions 148. In some cases, training data may include historical interactions where human operators resolved unclear directives, synthetic ambiguous examples generated by perturbing structured requests, and/or domain-specific corpora containing patterns of underspecified instructions. The learned model may output disambiguated parameters, rank plausible interpretations, and/or detect when the ambiguity exceeds an acceptable threshold and user input is required. Retraining of the disambiguation model may occur periodically to incorporate new conversational patterns, expanded agent capabilities, or updated workflow schemas.

In an embodiment, through these additional mechanisms, system 100 may ensure robust ambiguity handling in conversational environments where user inputs are informal, truncated, and/or context-dependent, thereby enabling the extraction module to produce reliable structured requests suitable for downstream routing and agent execution.

In continued reference to FIG. 1, in an embodiment, at least a processor 108 may be configured to access a thread-level context object 122 as a function of the conversation thread 120. For purposes of the present disclosure, a "thread-level context object" is a data construct that maintains state information associated with a particular conversation thread. For example, this may include state information including data required to preserve continuity across multiple agent operations. As non-limiting examples, the thread-level context object 122 may store one or more of: prior user inputs, extracted request representations, previously generated agent outputs, workflow state variables, intermediate task results, compliance flags, execution constraints, and/or identifiers of agents that have acted during the thread. In some embodiments, the thread-level context object 122 may further include metadata describing the temporal ordering of events, dependency relationships between tasks, and/or role-specific access restrictions relevant to downstream agent execution. In an embodiment, the thread-level context object 122 may enable system 100 to reestablish context for each newly received request 118, ensuring that agents operate with awareness of the evolving state of the conversation thread 120 and reducing the need for repetitive or redundant context reconstruction across asynchronous or multi-step workflows.

With further reference to FIG. 1, in an embodiment, accessing the thread-level context object 122 may include identifying the thread-level context object 122 as a function of an identifier of the conversation thread 120. For purposes of the present disclosure, an "identifier" is a unique or quasi-unique data element that distinguishes one conversational thread from another within a multi-threaded conversational computing environment. As non-limiting examples, an identifier may include a string token assigned when a conversation is initiated, a hash derived from session metadata, a universally unique identifier (UUID), a channel-specific thread ID, and/or a correlation token generated by an upstream orchestration service. In some embodiments, the identifier may be embedded within inbound user inputs, included in metadata accompanying requests 118 issued by other agents, or maintained as part of a session-management data structure. In an embodiment, identifying the thread-level context object 122 may include performing a lookup operation in a context store, such as an in-memory key-value store, a document database, a distributed cache, and/or a persistence layer that maintains serialized context objects. In an embodiment, system 100 may use the identifier as a lookup key to retrieve the corresponding thread-level context object 122, validate that the retrieved object matches the active conversation thread 120, and optionally load the object into memory for subsequent modification. In some embodiments, if the identifier does not correspond to an existing context object, system 100 may instantiate a new context object and associate it with the identifier, ensuring that all future operations within the conversation thread 120 share a consistent state representation. By leveraging the identifier in this manner, system 100 may ensure that each request 118 is processed in alignment with the appropriate conversational context, even in environments supporting concurrent or overlapping conversation threads.

With continued reference to FIG. 1, in an embodiment, the thread-level context object 122 may be stored in a serialized format 152 for persistence across multiple operations performed within the conversation thread 120. For purposes of the present disclosure, "serialized format" is any representation in which the context object is converted into a storable or transmittable data structure such that it can be reconstructed at a later time with structural fidelity. As non-limiting examples, the serialized format 152 may include JSON, Protobuf, Avro, MessagePack, binary-encoded key-value pairs, and/or a domain-specific serialization schema tailored to the needs of the multi-agent workflow. In some embodiments, the serialized context object may include version identifiers, timestamps, and/or integrity markers enabling system 100 to detect stale data, perform merge operations, and/or reconcile concurrent updates originating from different agents. In an embodiment, storing the thread-level context object 122 in serialized form may allow system 100 to maintain continuity across asynchronous or distributed operations. As non-limiting examples, a serialized context object may be written to a persistent storage layer such as a document store, a distributed file system, a durable key-value database, and/or a cloud-hosted object store. When a subsequent request 118 associated with the same conversation thread 120 is received, system 100 may retrieve the serialized object, deserialize it into an in-memory representation, and apply updates based on new agent outputs or newly extracted request information. In some embodiments, serialization may further enable efficient transmission of the context object across process boundaries, between microservices, and/or among agents executing in remote execution environments while ensuring that consistent state is preserved at each routing step. In additional embodiments, system 100 may support incremental serialization or patch-based serialization, wherein only the portions of the context object modified since the last operation are encoded and persisted. Such approaches may reduce computational overhead and enable fine-grained concurrency control. In some cases, system 100 may maintain a version log or snapshot history, allowing previous states of the context object to be reconstructed for debugging, auditing, and/or compliance review. By storing the thread-level context object 122 in serialized form, system 100 may ensure that each agent can reliably access an accurate, durable, and traceable view of the conversational state, even in multi-step workflows, distributed deployments, and/or environments with delayed or asynchronous agent responses.

Still referring to FIG. 1, in an embodiment, at least a processor 108 may be configured to determine an intent 124 and a routing condition 126 for the request 118 as a function of the thread-level context object 122. For purposes of the present disclosure, an "intent" is a representation of the underlying purpose or operational objective expressed in the request 118. As non-limiting examples, an intent 124 may correspond to an action such as querying a workflow status, generating a summary, retrieving client-associated information, updating a protocol step, validating a compliance requirement, and/or initiating a downstream task to be performed by an agent. For purposes of the present disclosure, a "routing condition" is a specification that identifies one or more computational requirements for satisfying the intent 124. For example, such as an operation category, required agent capabilities, data-access scopes, execution constraints, and/or policy considerations encoded within the thread-level context object 122. In certain embodiments, system 100 may analyze both the request 118 and the contextual state maintained in the thread-level context object 122 to determine which agents are eligible to handle the request 118, whether additional constraints apply, and whether prior agent activity or workflow state influences the routing outcome. By determining the intent 124 and routing condition 126 in this manner, system 100 may ensure that routing decisions remain sensitive to both the semantic content of the request 118 and the evolving state of the conversation thread 120.

In further reference to FIG. 1, in an embodiment, determining the intent 124 and the routing condition 126 of the request 118 may include generating an intent representation 128 as a function of at least one characteristic 130 of the request 118. For purposes of the present disclosure, an "intent representation" is a structured or vectorized encoding that captures the semantic purpose, operational objective, or action implied by the request 118. As non-limiting examples, the intent representation 128 may take the form of an embedding generated by a language model, a symbolic label drawn from a predefined taxonomy of supported operations, a multi-dimensional feature vector encoding request semantics, and/or a hybrid structure combining both symbolic and learned features. For purposes of the present disclosure, a "characteristic" of the request refers to any detectable property or attribute of the request. For example, and without limitation, this may include lexical content, syntactic structure, semantic meaning, referenced entities, temporal indicators, and/or interaction patterns observed within the conversation thread 120. In some embodiments, generating the intent representation 128 may include applying one or more natural-language processing techniques to analyze the conversational instruction 148. Example techniques may include tokenization, part-of-speech tagging, dependency parsing, semantic-role labeling, and/or embedding generation using a transformer-based model. In further embodiments, system 100 may evaluate the request 118 in conjunction with information extracted from the thread-level context object 122, such as prior agent outputs, active workflow states, and/or recent user interactions, to refine or disambiguate the resulting intent representation 128. In additional embodiments, generating the intent representation 128 may include mapping the request 118 to a canonical operation type, such as a query, update, validation, summarization, and/or task-generation operation, based on characteristic patterns learned from training data. By generating an intent representation 128 in this manner, system 100 may produce a standardized, machine-interpretable encoding that enables downstream modules, such as the routing subsystem, to evaluate capability requirements, enforce policy constraints, and/or determine which agent is best suited to execute the requested operation.

With continued reference to FIG. 1, in some embodiments, generating the intent representation 128 may further include applying a multi-stage interpretation routine that processes the conversational instruction 148 in conjunction with contextual signals drawn from the thread-level context object 122. As a non-limiting example, a conversational instruction 148 such as "check the status of the assessment" may be analyzed by a language-processing module to identify the operative phrase "check the status," which may be mapped to a canonical query-type operation. The module may then detect the referenced entity "the assessment" as a characteristic parameter associated with an active workflow step stored in the thread-level context object 122. In an embodiment, system 100 may combine these detected characteristics into a unified representation, such as an embedding that encodes both the query-type intent and the entity reference, or a symbolic structure specifying that the request 118 seeks retrieval of a state variable associated with an assessment task. In some embodiments, the intent representation 128 may incorporate confidence scores, feature weights, and/or context-derived modifiers indicating that the assessment referenced in the request 118 corresponds to the most recently active task in the conversation thread 120. Through this type of broad interpretive process, system 100 may transform informal natural-language instructions into intent representations 128 that are stable, precise, and interoperable with downstream routing logic.

With continued reference to FIG. 1, in an embodiment, determining the intent 124 and the routing condition 126 of the request 118 may include determining the routing condition 126 as a function of evaluating at least one policy constraint 132 encoded in the thread-level context object 122 against the intent representation 128. For purposes of the present disclosure, a "policy constraint" is a rule, restriction, or condition that governs how a request 118 is executed within the multi-agent workflow. As non-limiting examples, a policy constraint may specify data-access limitations, agent-capability requirements, privacy restrictions, role-based permissions, compliance protocols, workflow sequencing rules, and/or temporal or state-dependent execution conditions. In an embodiment, policy constraints may be authored by system administrators, inferred from workflow configuration files, embedded in regulatory or organizational policies, and/or generated dynamically by upstream agents. In an embodiment, these constraints may be encoded within the thread-level context object 122 so that every request 118 processed within the conversation thread 120 is evaluated in light of the current operational, regulatory, and contextual state.

In further reference to FIG. 1, in certain embodiments, evaluating the policy constraint against the intent representation 128 may include applying one or more rule-evaluation techniques, such as pattern matching, constraint satisfaction logic, logical proposition evaluation, and/or scoring routines that assess whether the intent representation 128 meets the requirements specified by the policy constraint. As a non-limiting example, if the intent representation 128 indicates a request 118 to retrieve client financial information, system 100 may consult a policy constraint that specifies that only agents with a "financial-data-access" capability scope may act on the request 118. As another example, if the intent representation 128 corresponds to an operation that changes workflow state (e.g., "mark task complete"), system 100 may evaluate constraints requiring that only agents with "task-modification" capability or supervisor-level permissions may perform the operation.

In continued reference to FIG. 1, in further embodiments, evaluating policy constraints may include retrieving multiple constraints stored in the thread-level context object 122 and performing aggregate evaluation. Such evaluation may include conjunction (logical AND) of constraints, disjunction (logical OR), weighted prioritization, and/or hierarchical override rules. In an embodiment, the output of this evaluation may be used to generate the routing condition 126, which may specify, without limitation, one or more required agent capabilities, allowable agent types, required access scopes, compliance checks to be performed, and/or contextual dependencies that influence agent selection. In some embodiments, the routing condition 126 may also include supplemental metadata, such as execution notes, safety indicators, and/or indicators that the operation must remain within a specific compliance boundary. In this manner, the routing condition 126 produced from evaluating the policy constraints against the intent representation 128 may ensure that the routing subsystem selects an agent that not only matches the semantic requirements of the task but also satisfies operational, privacy, and regulatory conditions encoded in the conversation's evolving context.

Still referring to FIG. 1, in some embodiments, generating the routing condition 126 may further include constructing a routing-condition object that encodes the computational, capability, and policy requirements derived from evaluating the intent representation 128. As a non-limiting example, the routing-condition object may specify one or more required agent capabilities (e.g., "status-query," "workflow-update," "compliance-check"), data-access scopes (e.g., "read-only," "restricted-entity access"), and execution constraints (e.g., "must operate within protocol X," "only permitted for advisor-role agents"). In an embodiment, the routing-condition object may also include a set of prohibitions or exclusion rules derived from policy constraints, such as agents that are disallowed from acting due to insufficient permissions or conflicting workflow state. In certain embodiments, if the evaluation of multiple policy constraints produces conflicting requirements, such as one rule indicating that an operation must be performed by the originating agent while another rule requires escalation to a supervisory agent, system 100 may apply conflict-resolution logic. Such logic may include rule prioritization, confidence weighting, policy hierarchy evaluation, and/or fallback selection based on predefined resolution heuristics.

In further reference to FIG. 1, in some embodiments, the routing condition 126 may be updated dynamically as the conversation thread 120 evolves. For example, if a prior agent action introduces new compliance restrictions or updates workflow state variables encoded in the thread-level context object 122, subsequent routing conditions 162 generated for later requests 118 may reflect those changes. In additional embodiments, the routing subsystem may generate fallback routing conditions when the primary routing condition cannot be satisfied by any available agent. As non-limiting examples, fallback routing may include selecting a general-purpose agent capable of performing clarification, routing the request 118 to an agent configured to inspect context in depth, and/or generating a deferred operation until additional contextual information becomes available. Through these extended mechanisms, system 100 maintains robust, context-aware routing behavior across multi-agent workflows, even in the presence of shifting context, newly introduced constraints, and/or ambiguous operational requirements.

With continued reference to FIG. 1, in some embodiments, determining the routing condition 126 or selecting an appropriate agent to satisfy the routing condition 126 may additionally include applying a machine-learning model trained to predict optimal agent-task pairings. Such a model may receive, as input, one or more features derived from the intent representation 128, the thread-level context object 122, prior agent outputs, user interaction patterns, and/or workflow metadata associated with the conversation thread 120. The model may output, without limitation, a ranked list of candidate agents, a probability distribution over agent capabilities, a confidence score indicating the expected suitability of each agent, and/or a recommended routing condition refinement. In certain embodiments, the model may be trained on historical request-agent pairings collected from prior executions of the multi-agent system, synthetic workflows generated to simulate complex task sequences, and/or curated datasets describing typical operational patterns within a given domain. Training may be performed using supervised learning, reinforcement learning, and/or multi-task representation learning, enabling the model to internalize patterns regarding which agents tend to perform best under specific contextual, semantic, and/or policy-driven conditions. In this manner, system 100 may supplement or enhance deterministic policy evaluation using learned behaviors drawn from historical operational data.

In continued reference to FIG. 1, in additional embodiments, routing decisions may be produced using a hybrid approach that combines explicit policy-constraint evaluation with model-driven inference. For example, a rule-based engine may first filter out agents that violate mandatory policy constraints or lack essential capabilities specified in the routing condition 126. In an embodiment, a learned model may then operate on the remaining candidate set to predict which agent is most likely to satisfy the intent 124 efficiently or accurately given the current workflow state. In some cases, the model may incorporate features such as agent execution latency, historical success rates, error frequencies, contextual similarity to previous requests, and/or compatibility with recently updated context-object fields. In some embodiments, system 100 may employ continual-learning strategies in which model parameters are periodically retrained or fine-tuned using newly accumulated interaction logs, allowing the routing subsystem to adapt to evolving workflows, expanded agent capabilities, and/or shifting user behavior. In this manner, the routing logic may remain robust, flexible, and context-aware, leveraging both rule-driven correctness and data-driven optimization to select the most appropriate agent for the request 118.

Still referring to FIG. 1, in an embodiment, at least a processor 108 may be configured to select, from a plurality of software agents 134, a first agent 136 having a capability profile 138 that satisfies the routing condition 126. For purposes of the present disclosure, a "software agent" is a computational module configured to perform one or more operations in response to task instructions derived from the conversational workflow. In an embodiment, the software agent may be executed locally, remotely, and/or across a distributed system. As non-limiting examples, software agents may include agents configured to retrieve information from a data store, analyze workflow state, validate compliance requirements, generate summaries, perform scheduling operations, and/or create downstream tasks for other agents. For purposes of the present disclosure, a "capability profile" is a description of the operations, data-access scopes, execution permissions, or functional competencies supported by a given software agent. In an embodiment, a capability profile 138 may include, without limitation, a list of supported operation types, required or optional input parameters, policy scopes, security classification levels, and/or performance characteristics such as latency or resource usage. In some embodiments, at least a processor 108 may evaluate the routing condition 126 generated in earlier operations against the capability profiles 138 of the available agents to determine which agents are eligible to satisfy the request 118. Such evaluation may include verifying that the agent supports the operation type identified in the intent representation 128, confirming that the agent's access scope satisfies policy constraints, and ensuring that the agent is permitted to act within the state and conditions defined by the thread-level context object 122. Through this selection process, system 100 may identify a first agent 136 whose capabilities align with the functional, contextual, and policy-driven requirements of the request 118.

In further reference to FIG. 1, in some embodiments, evaluating whether an agent satisfies the routing condition 126 may include performing a structured comparison between attributes of the routing condition 126 and elements of each agent's capability profile 138. As a non-limiting example, system 100 may compare the operation type encoded in the intent representation 128 with a list of operation types supported by each agent, determine whether the agent's access scope aligns with the data-access or compliance requirements specified in the routing condition 126, and assess whether workflow-state constraints encoded in the thread-level context object 122 permit the agent to execute the requested operation. In certain embodiments, the evaluation may be performed using a scoring function that assigns weighted values to matched or mismatched criteria. Such a scoring function may consider factor groups such as capability alignment, policy compliance, agent availability, historical performance indicators, and/or contextual relevance to ongoing tasks within the conversation thread 120. In an embodiment, system 100 may then compute an aggregate score for each agent and compare the score against a predetermined or adaptive threshold. If an agent's score exceeds the threshold, the agent may be marked as eligible; if multiple agents exceed the threshold, system 100 may rank them based on score or additional heuristics and select the agent with the highest score. In additional embodiments, the evaluation process may include soft constraints, represented by optional scoring boosts or penalties, allowing system 100 to incorporate domain-specific preferences, such as preferring agents with lower latency, preferring agents specializing in a particular workflow domain, and/or avoiding agents recently involved in a related operation to promote diversity in multi-agent reasoning patterns. This structured evaluation mechanism may ensure that agent selection remains robust, context-aware, and adaptive to both policy-driven and performance-driven considerations.

With further reference to FIG. 1, in an embodiment, the plurality of software agents 134 may be stored in an agent registry 154, wherein the agent registry 154 stores, for each software agent of the plurality of software agents 134, a capability manifest 156. For purposes of the present disclosure, an "agent registry" is a data store or index that maintains metadata, configuration information, and operational descriptors for each software agent available within the multi-agent environment. As non-limiting examples, the agent registry 154 may be implemented as a relational database, a document store, a graph-based index, a distributed key-value store, and/or an in-memory catalog maintained by an orchestration service. In an embodiment, the agent registry 154 may store, for each agent, identifier information, version data, capability descriptors, policy scope definitions, performance metrics, supported input/output formats, and/or any relevant constraints or operational prerequisites. For purposes of the present disclosure, a "capability manifest" is a representation describing the functional abilities, permissions, operational scope, and data-access characteristics of a given software agent. As non-limiting examples, a capability manifest 156 may include one or more of: supported operation types (e.g., "status-query," "summary-generation," "task-update"), required input parameters, available action primitives, role- or permission-level classifications, compliance or privacy domain assignments, latency expectations, or quality-of-service characteristics. In some embodiments, capability manifests 156 may also store dependency information indicating which tasks the agent must complete before performing others, compatibility constraints specifying which conversation states the agent can operate in, or domain annotations describing the workflows or entities the agent specializes in.

Still referring to FIG. 1, in certain embodiments, the agent registry 154 may expose programmatic interfaces that allow the routing subsystem to retrieve capability manifests 156 using agent identifiers, filter agents according to the requirements specified in the routing condition 126, and/or update manifests when an agent's capabilities evolve. In an embodiment, the agent registry 154 may be updated manually by system administrators, programmatically by agent developers, and/or autonomously by system 100 when agents undergo training or reconfiguration. By storing capability manifests 156 in an agent registry 154, system 100 may provide a centralized, authoritative dataset that the routing subsystem may query to determine which agent is best suited to process a given request 118 under the constraints and context of the conversation thread 120.

In further reference to FIG. 1, in some embodiments, the agent registry 154 may be dynamically updated in response to the introduction of new software agents or the expansion of capabilities within existing agents. For example, when a new agent is deployed into the computing environment or when an existing agent receives an additional functional module, configuration package, and/or authorization scope, system 100 may generate or update the corresponding capability manifest 156 to reflect the newly available operations, parameters, and policy scopes. Such updates may be applied programmatically through an automated ingestion pipeline that detects changes in agent code artifacts, configuration files, and/or service descriptors, or through a registration API that allows agent developers or administrative subsystems to publish updated manifests directly to the registry. In certain embodiments, the agent registry 154 may employ validation routines to ensure that new or modified manifests comply with schema requirements, do not conflict with existing policy constraints, and do not introduce ambiguous or overlapping capability definitions that could impede routing decisions. In additional embodiments, the routing subsystem may subscribe to change notifications emitted by the registry so that any newly available capabilities are incorporated into subsequent routing-condition evaluations without requiring manual synchronization or system restart. Through these mechanisms, system 100 may adapt to the proliferation of new agents and continuously evolving capability sets while maintaining accurate, authoritative manifest data for all routing and selection operations.

With continued reference to FIG. 1, in an embodiment, selecting the first agent 136 may include identifying, as a function of the routing condition 126, the capability manifest 156 that satisfies the routing condition 126. In some embodiments, identifying the capability manifest 156 may include comparing one or more attributes encoded in the routing condition 126, such as required operation type, parameter requirements, access permissions, compliance constraints, and/or workflow-state limitations, against corresponding fields stored in the capability manifest 156 of each software agent. For example, if the routing condition 126 specifies that the request 118 involves a "status-query" operation requiring read-only access to a particular workflow domain, system 100 may inspect capability manifests 156 to determine which agents declare support for the "status-query" operation type and possess the necessary access scope. In certain embodiments, system 100 may perform a structured matching process in which the routing subsystem evaluates each manifest field using deterministic rules, pattern-matching logic, and/or a scoring function that weights the compatibility of manifest attributes with the requirements enumerated in the routing condition 126. In an embodiment, manifests that fail to satisfy mandatory constraints may be filtered out, while those that meet all essential requirements may be ranked or selected as eligible candidates. Once the capability manifest 156 that best satisfies the routing condition 126 is identified, system 100 may designate the corresponding software agent as the first agent 136 for execution of the request 118. By identifying the capability manifest 156 in this manner, system 100 may ensure that the selected agent is not only functionally compatible with the intent 124 of the request 118 but also fully aligned with the policy, compliance, and contextual conditions encoded in the thread-level context object 122.

Still referring to FIG. 1, in some embodiments, when multiple capability manifests 156 satisfy the routing condition 126, selecting the first agent 136 may further include applying one or more tie-breaking or optimization strategies to identify the most suitable agent among the eligible candidates. As a non-limiting example, system 100 may compute a ranking score for each candidate agent based on factors such as historical task performance, execution latency, error frequency, contextual relevance to previously completed operations in the same conversation thread 120, and/or agent-specific suitability heuristics derived from domain knowledge. In certain embodiments, the routing subsystem may apply a weighted scoring model in which capability alignment receives a primary weight while secondary factors, such as agent availability, recent workload, or expected computational cost, are assigned lower weights. In an embodiment, system 100 may additionally incorporate dynamic features stored in the thread-level context object 122, such as whether an agent has recently interacted with the same workflow entity or whether a prior agent in the chain established a preference for continuity. In further embodiments, system 100 may apply deterministic rules (e.g., selecting the highest-ranked agent), probabilistic selection (e.g., softmax sampling across candidate scores), and/or fallback strategies (e.g., preferring general-purpose agents in ambiguous cases). Through these mechanisms, system may be able to optimize agent selection beyond mere compatibility, ensuring efficient, context-aware, and robust execution of multi-agent workflows.

In continued reference to FIG. 1, in an embodiment, at least a processor 108 may be configured to provide the first agent 136 with at least a portion of the thread-level context object 140. In an embodiment, a "portion" of the thread-level context object 140 may include any subset of contextual information selected from the full state associated with the conversation thread 120. As non-limiting examples, a portion may include workflow state variables, extracted request parameters, identifiers of relevant entities, intermediate task results, and/or compliance flags associated with an ongoing process. In some embodiments, a portion may include only the specific elements necessary for the first agent 136 to perform its designated operation, such as a client identifier, a protocol step, a status value, and/or attributes of a particular task. In additional embodiments, system 100 may provide the entire thread-level context object 122 to the first agent 136 when permitted by access scopes, when required to perform complex multi-step operations, or when the complete context is needed for accurate reasoning or decision-making. Thus, as used herein, "at least a portion" encompasses embodiments in which the full context object is supplied as well as embodiments in which only a filtered or minimal subset is transmitted to the agent.

With further reference to FIG. 1, in an embodiment, the first agent 136 may be configured to perform at least a first operation 142 as a function of the request 118. For purposes of the present disclosure, an "operation" is any computational task, workflow action, or state evaluation that the agent is designed to carry out within the advisor environment. As non-limiting examples, an operation may include determining whether a client has completed an assessment, retrieving the latest progress within a family protocol template, generating a summary of recent interactions, identifying outstanding tasks assigned to a household member, evaluating whether a workflow step meets compliance conditions, surfacing insights about risk indicators in a client's journey, and/or preparing a brief summarizing key attributes of a client's profile. In some embodiments, the operation may involve analyzing the conversation thread's historical context, performing a domain-specific lookup, triggering downstream tasks for other agents, and/or updating advisor-facing records to reflect the result of the operation. By providing the first agent 136 with an appropriate portion of the thread-level context object 122, system 100 may ensure that each operation is executed with the necessary contextual grounding required for accurate, consistent, and context-preserving workflow execution.

Still referring to FIG. 1, in an embodiment, providing the first agent 136 with the at least a portion of the thread-level context object 140 may include generating a filtered subset 158 of the thread-level context object 122 as a function of one or more access limitations 160 associated with the first agent 136. For purposes of the present disclosure, a "filtered subset" is a reduced or modified version of the thread-level context object 122 that includes only those elements of contextual information that the first agent 136 is permitted to access or that are necessary for execution of its assigned operation. As non-limiting examples, a filtered subset 158 may include selected workflow state attributes, identifiers for tasks relevant to the agent's capabilities, a subset of client-related fields, and/or partial results generated by previous agents. In an embodiment, the filtered subset 158 may omit, redact, anonymize, and/or obfuscate context fields that fall outside the agent's authorized access scope or that contain sensitive data not required for the agent's designated operation. For purposes of the present disclosure, an "access limitation" is any element that governs the visibility of elements within the thread-level context object 122 for a particular agent. In an embodiment, access limitations may be derived from the agent's capability manifest 156, the agent's policy scope, organizational or regulatory compliance rules, data-privacy classifications, and/or workflow-condition constraints encoded in the thread-level context object 122. As non-limiting examples, an access limitation may prohibit an agent from viewing confidential client financial details, may restrict an agent to read-only access in certain workflow domains, and/or may prevent an agent from receiving information relating to tasks assigned to roles with elevated permissions.

In continued reference to FIG. 1, in some embodiments, generating the filtered subset 158 may include evaluating the access limitations against each field, attribute, and/or segment of the thread-level context object 122 and selectively including or excluding content accordingly. In an embodiment, system 100 may apply a rule-based filter, a policy engine, and/or a masking function to remove disallowed elements or to transform sensitive fields into authorized forms (e.g., hashed identifiers or role-filtered views). In other embodiments, system 100 may generate the filtered subset 158 using a schema-driven projection that extracts only the fields explicitly permitted for the agent's capability class. As a non-limiting example relevant to advisor workflows, a planning-summary agent may receive a filtered subset 158 containing the client's completed assessment results and protocol-step status, while a compliance-validation agent may receive only audit-relevant context fields, such as timestamps, actor identifiers, and/or workflow-state indicators. By generating a filtered subset 158 in this manner, system 100 may ensure that each agent receives exactly the contextual data required for accurate execution while maintaining strict adherence to access controls, privacy boundaries, and policy constraints.

With continued reference to FIG. 1, in some embodiments, generating the filtered subset 158 of the thread-level context object 122 may include applying one or more rule-based filtering routines that operate at the field, record, or segment level of the context object. In an embodiment, a filtering engine may traverse the structure of the context object and evaluate each field against a set of access-control rules or policy definitions associated with the first agent 136. Fields that do not satisfy the applicable rules, for example, fields whose classification level exceeds the agent's access scope or that belong to workflow domains outside the agent's capability manifest 156, may be omitted entirely from the filtered subset 158. In certain implementations, this omission may be realized by removing the field from the serialized representation, replacing the field with a null or empty value, and/or excluding the field from a projection query that materializes the filtered subset 158 from a backing store. In some embodiments, redaction may be applied instead of outright omission when structural or referential integrity needs to be preserved while concealing specific values. In an embodiment, redaction may include replacing sensitive values with placeholder tokens, masked strings, and/or generalized descriptors. As non-limiting examples, a client name may be replaced with a pseudonymous label (e.g., "Client A"), a numeric score may be bucketed into a range (e.g., "high," "medium," "low"), and/or a free-text note may be truncated to exclude personally identifiable details while retaining general context. In an embodiment, a redaction module may be configured using pattern rules, data-type classifications, or sensitivity tags encoded in the context object, and may operate prior to serialization or during a transformation step that prepares the filtered subset 158 for transmission to the first agent 136.

In further reference to FIG. 1, in additional embodiments, anonymization or obfuscation may be employed to allow the first agent 136 to operate on abstracted or de-identified context while preventing the agent from accessing raw sensitive values. In an embodiment, anonymization mechanisms may include hashing identifiers, tokenizing keys that reference underlying records, aggregating multiple fine-grained values into coarser statistics, and/or removing quasi-identifiers that could enable re-identification. In some cases, obfuscation may further include encrypting selected fields with keys not accessible to the agent, encoding references as opaque handles that can only be resolved by a trusted intermediary, and/or introducing controlled noise into non-critical numeric attributes to satisfy privacy constraints while still enabling approximate analysis. In some embodiments, these transformations may be driven by policy metadata stored in the thread-level context object 122, such that different agents receive differently anonymized or obfuscated views of the same underlying state depending on their associated access limitations and policy scopes. In certain embodiments, the filtering, redaction, anonymization, and obfuscation operations may be orchestrated by a dedicated context-view generation module. This module may receive the full thread-level context object 122 and a description of the first agent's access limitations, apply a sequence of transformation passes, and output a filtered subset 158 that is both structurally valid and policy-compliant. In an embodiment, the transformation passes may include schema-based projection, classification-based masking, sensitivity-aware anonymization, and/or encryption or tokenization of designated fields. The resulting filtered subset 158 may then be serialized and transmitted to the first agent 136 over an authenticated communication channel. By implementing these mechanisms in a modular fashion, system 100 can adapt to evolving privacy requirements, regulatory changes, or new agent types without altering the core structure of the thread-level context object 122.

Still referring to FIG. 1, in some embodiments, one or more of the filtering, redaction, anonymization, and/or obfuscation modules may be trained or refined using machine-learning techniques to improve their ability to identify sensitive fields, predict appropriate transformations, and/or adapt filtering behavior to evolving compliance requirements. Training data may include historical thread-level context objects 122 paired with policy outcomes, agent-access logs annotated with permitted or denied field exposures or curated examples demonstrating correct redaction or anonymization patterns for particular data types. In an embodiment, a classification model may be trained to label each field within a context object according to sensitivity classes (e.g., "public," "restricted," "advisor-only," "confidential"), whereas a sequence-to-sequence model may be trained to generate masked or abstracted representations for free-text notes. In some embodiments, reinforcement learning may be used wherein a filtering policy is rewarded for producing views that both satisfy access limitations and preserve sufficient information for the receiving agent to perform its designated operation. In further embodiments, continuous retraining or fine-tuning may occur using feedback gathered from agent execution results, privacy audits, and/or user corrections, enabling the filtering subsystem to evolve alongside organizational policies, new agent types, or changes in regulatory constraints.

With further reference to FIG. 1, in an embodiment, at least a processor 108 may be configured to receive, from the first agent 136, a first result 144 of the at least a first operation 142. For purposes of this disclosure, a "result" is any output generated by an agent in response to processing a request 118, context subset, or operation directive. In an embodiment, a result may encompass structured data, unstructured data, executable artifacts, and/or state-change indicators and may take any suitable form for communication between computational entities. As non-limiting examples, a result may include a structured object representing a completed subtask; a natural-language string summarizing findings; a numerical score, flag, or confidence value indicating whether a condition has been met; or a modification instruction that updates a workflow item, record, or protocol element associated with the conversation thread 120. In some embodiments, a result may include a hyperparameter or configuration update; a generated recommendation; a task assignment; and/or a reference to a data record retrieved or computed by the agent. In further embodiments, a result may be encoded as JSON, XML, a binary message, a protobuf, a serialized token, and/or an embedding vector suitable for downstream machine-learning operations. In advisor-workflow contexts, results may include, without limitation: a determination of whether a client has completed a required assessment; a summary of outstanding tasks for a household; a compliance-screening decision; a recommended next step in a protocol or journey; and/or a synthesized brief prepared for presentation to a practitioner. Regardless of form, the result may provide system 100 with actionable information that enables subsequent updates to the thread-level context object 122 and informs later routing decisions within the conversation thread 120.

In continued reference to FIG. 1, in further embodiments, receiving the first result 144 from the first agent 136 may be accomplished through any of several communication or invocation pathways suitable for inter-agent or service-to-service messaging. In some embodiments, the result may be returned through an authenticated inter-process communication (IPC) channel, such as a secure HTTP callback endpoint, a message-queue consumer, a gRPC stream, and/or a publish-subscribe ("pub/sub") event emitted to a routing layer. In other embodiments, at least a processor 108 may retrieve the result from a shared memory region, a temporary object store, and/or a task execution environment in which the first agent 136 deposits outputs upon completing the operation. In an embodiment, asynchronous delivery mechanisms may also be employed, wherein the first agent 136 posts a result token or message to a job queue, worker exchange, and/or message bus, and at least a processor 108 subsequently polls, listens, and/or subscribes for the corresponding event. As a further non-limiting example, an agent may return the result using a signed payload carrying a correlation identifier shared with the original request, thereby enabling at least a processor 108 to associate the returned result with the appropriate conversation thread 120 and context object. In some embodiments, the receipt of a result may also include verifying authenticity or integrity using cryptographic signatures, sequence numbers, and/or integrity hashes to ensure that the result was produced by the expected agent and has not been altered in transit. Such mechanisms may support reliable, verifiable, and context-aware integration of agent outputs into the broader multi-agent orchestration pipeline.

Still referring to FIG. 1, in some embodiments, receiving the result from the first agent 136 may further include performing one or more communication-integrity checks to ensure that the returned data is authentic, complete, and associated with the correct execution context. For example, system 100 may verify that the result includes a correlation identifier matching the originating request, validate a cryptographic signature generated using a key assigned to the first agent 136, and/or compare an integrity hash of the result payload against a value stored in the thread-level context object 122. In additional embodiments, system 100 may evaluate version identifiers, sequence counters, and/or provenance tokens to confirm that the result reflects the most recent invocation and is not superseded by a later execution. These integrity checks may allow at least a processor 108 to reliably incorporate the result into downstream computation even in environments that involve asynchronous execution, distributed agents, and/or partial trust relationships between system components. In further embodiments, receiving the result may include performing error-handling and/or anomaly-detection logic configured to identify incomplete, malformed, contradictory, and/or low-confidence results. As non-limiting examples, system 100 may detect that a required field is missing from the returned payload; that the result conflicts with existing entries in the thread-level context object 122; that the first agent 136 reported an internal processing error; and/or that a model-generated output does not meet a confidence threshold associated with a particular policy constraint. Upon detecting such an anomaly, system 100 may annotate the result with an error state, generate an event for diagnostic analysis, and/or route the request 118 to a fallback or supervisory agent configured to perform clarification, recomputation, and/or contextual verification. In some embodiments, system 100 may request additional data from the first agent 136, re-issue the operation with adjusted parameters, and/or escalate the issue to a human review pathway when predefined confidence or safety constraints are not met. In yet further embodiments, system 100 may implement timeout and failure-recovery mechanisms governing return of the result from the first agent 136. For example, at least a processor 108 may determine that a timeout condition has occurred when a result is not received within a predefined time window determined as a function of the operation type, resource requirements, and/or agent performance profile. When a timeout is detected, system 100 may cancel the outstanding execution request, reassign the operation to a different agent with comparable capabilities, and/or generate a degraded-mode result indicating partial completion. In some embodiments, system 100 may maintain a retry policy, such as re-invoking the first agent 136 with adjusted parameters, selecting a fallback agent configured for approximation or summary generation, and/or queuing the operation for later processing during periods of lower system load. These timeout and recovery pathways may allow system 100 to maintain continuity of the conversation thread 120 and preserve the consistency of the thread-level context object 122 even when individual agents become unavailable or experience execution delays.

In further reference to FIG. 1, in some embodiments, receiving the result from the first agent 136 may further include performing one or more normalization operations to transform the returned payload into a standardized representation suitable for integration into the thread-level context object 122. In an embodiment, normalization may include, without limitation, converting the result into a common schema, reconciling datatype differences, mapping agent-specific field names into system-defined canonical identifiers, and/or restructuring nested objects into a uniform hierarchical format. As a non-limiting example, one agent may return a task update as a natural-language sentence, while another agent may return a structured JSON object describing the same update; normalization logic may convert both into a standardized task-update structure that system 100 can process consistently. In some embodiments, normalization may additionally include applying embeddings, vectorization, de-duplication, and/or semantic harmonization functions to ensure that results generated by heterogeneous agents remain interoperable within the multi-agent orchestration pipeline.

In continued reference to FIG. 1, in some embodiments, the normalization logic may be implemented using one or more machine-learning models, rule-based systems, or hybrid transformation pipelines trained to convert heterogeneous agent outputs into a consistent canonical structure. In an embodiment, training datasets may include historical agent outputs paired with their desired normalized representations, synthetic examples produced by generating variations of the same semantic content in different formats, and/or annotated corpora derived from advisor-workflow records. In certain embodiments, supervised learning may be used, wherein human annotators or system-defined rules provide gold-standard mappings that the model learns to reproduce. In other embodiments, semi-supervised or unsupervised techniques such as clustering or embedding-space alignment may be employed to discover structural correspondences among diverse result payloads. In an embodiment, retraining may occur periodically based on the introduction of new agents, changes in schema standards, and/or drift detected between the expected and observed formats of returned results. Such training pathways may enable the normalization logic to adapt as the multi-agent environment evolves.

With continued reference to FIG. 1, in further embodiments, receiving the result may include evaluating or ranking multiple candidate results when more than one agent produces an output for the same request or when the first agent 136 returns multiple alternative interpretations. Such ranking may be based on domain-specific scoring functions, agent confidence values, policy-alignment metrics, and/or similarity scores comparing the result to prior context stored in the thread-level context object 122. As a non-limiting example, when an advisor-facing agent produces both a recommended next step and an alternative fallback step, system 100 may rank these alternatives based on compliance constraints, inferred user preference history, and/or routable actionability. In some embodiments, ranking logic may incorporate machine-learning models trained on historical resolution patterns, prior agent-selection outcomes, and/or recorded decision traces, enabling system 100 to automatically select the most contextually appropriate result for downstream incorporation.

Still referring to FIG. 1, in some embodiments, the result-ranking logic may be implemented using one or more statistical models, machine-learning classifiers, or scoring functions trained to evaluate candidate results according to relevance, compliance alignment, contextual fit, and/or predicted usefulness. In an embodiment, training data may include historical multi-agent interactions paired with ground-truth selections indicating which result was ultimately used, resolved, or acted upon within real advisor workflows. Additional datasets may include synthetic pairwise comparisons generated from known decision heuristics, compliance guidelines, and/or routing outcomes stored in system logs. In some embodiments, ranking models may be trained using supervised learning, reinforcement learning informed by downstream success metrics, and/or preference-learning architectures configured to infer ranking order from examples. In an embodiment, the model may be periodically retrained in response to evolving domain rules, updated policy constraints, the introduction of new agent capability profiles 138, or shifts in user behavior patterns. These training pathways may allow the ranking logic to improve its ability to select the most contextually appropriate result over time.

In continued reference to FIG. 1, in yet further embodiments, receiving the result may include generating or updating a provenance model capturing metadata describing how, when, and by which agent the result was produced. In an embodiment, provenance data may include a unique agent identifier, timestamps, execution environment metadata, input parameters supplied to the agent, intermediate reasoning steps (where available and permitted), and version identifiers corresponding to the agent's capability profile 138 or model state. In some embodiments, the provenance model may be cryptographically chained across multiple results generated within the conversation thread 120, enabling verifiable reconstruction of how the thread-level context object 122 evolved over time. In additional embodiments, provenance modeling may support compliance auditing, explainability interfaces, conflict resolution when contradictory results are returned, and selection among competing agent outputs based on trust tiers or regulatory requirements associated with advisor workflows.

With further reference to FIG. 1, in some embodiments, the provenance-modeling subsystem may include one or more models or analytic modules trained to infer, reconstruct, and/or validate the provenance characteristics of a returned result. In an embodiment, training data may include prior executions in which detailed provenance metadata, such as agent identifiers, timestamps, version numbers, input parameters, and intermediate reasoning states, were captured and labeled within the system. In certain embodiments, machine-learning models may be trained to detect anomalies or missing elements in provenance chains by learning typical sequences of interactions, expected update flows, and legitimate agent handoff patterns. In further embodiments, system 100 may employ sequence models or graph-based learning architectures trained to represent the causal structure of multi-agent workflows. In an embodiment, retraining may occur when new agents are added, when routing policies are updated, and/or when the provenance schema is modified due to changes in compliance or auditing requirements. Such training may enable the provenance subsystem to maintain accurate, complete, and tamper-resistant lineage information as the multi-agent ecosystem grows more complex.

With continued reference to FIG. 1, in some embodiments, system 100 may employ one or more merge-policy models configured to determine how a result returned by an agent should be integrated into the existing thread-level context object 122. In an embodiment, training data for these merge-policy models may include historical sequences of context-object updates paired with ground-truth merge decisions, such as which fields were overwritten, which were appended, and which were left unchanged under prior system behavior or manual reviewer supervision. In certain embodiments, the training dataset may further include synthetic conflict scenarios generated by intentionally injecting contradictory, overlapping, and/or partially complete result payloads into prior context states, thereby allowing the model to learn how to choose between competing updates. In an embodiment, the merge-policy model may be trained using supervised learning, reinforcement learning driven by downstream task success, and/or rule-distillation techniques in which predefined heuristics, such as "prefer the most recent timestamp," "retain highest-confidence values," or "merge lists but overwrite scalars," are used as teacher policies. In an embodiment, retraining may occur automatically as new agent types are introduced, as schema definitions evolve, and/or when system 100 detects drift between expected and observed merge outcomes during operation. This training process may enable the merge-policy model to generalize across heterogeneous agent outputs and maintain a coherent, version-controlled thread-level context object 122 even in the presence of ambiguity or conflicting state updates.

Still referring to FIG. 1, in an embodiment, at least a processor 108 may be configured to update the thread-level context object 122 as a function of the first result 144 of the at least a first operation 142. In an embodiment, updating the thread-level context object 122 may encompass any modification, augmentation, and/or incorporation of information into the context object such that the conversational state reflects the consequences of the first agent's operation. In some embodiments, updating may include appending new state variables, replacing existing values with revised data, merging structured fields contained in the result payload, and/or generating new contextual entries that track progress, status changes, and/or derived insights produced by the first agent 136. As non-limiting examples, the update may include adding a completed-task marker, inserting a generated brief, recording a compliance outcome, storing a recommended next action, updating a client-status attribute, and/or inserting a reference to data retrieved by the agent. In certain embodiments, the update process may also include annotating the context object with provenance metadata associated with the result, adjusting internal timestamps or version counters, or marking specific fields as agent-owned or pending validation. In an embodiment, the update may be performed using a merge policy configured to ensure consistency, atomicity, and continuity of the context object across sequential operations within the conversation thread 120. Through this updating process, system 100 may maintain an accurate, evolving representation of the conversational state that enables subsequent routing decisions, inter-agent coordination, and context preservation across the lifecycle of the conversation thread 120.

In further reference to FIG. 1, in some embodiments, updating the thread-level context object 122 may include executing a merge operation configured to integrate the first result 144 into the existing context structure in a deterministic and reproducible manner. In an embodiment, the merge operation may be carried out by a merge module, a context manager, and/or a policy-driven update engine operating under the control of at least a processor 108. In certain embodiments, the merge operation may traverse the structure of the incoming result payload and align fields, keys, and/or semantic units with corresponding regions of the existing context object. In an embodiment, alignment may rely on schema definitions, ontology mappings, embedding-based similarity measurements, and/or explicit references encoded in the result payload. As non-limiting examples, the merge operation may: combine two lists representing outstanding tasks; overwrite a scalar value when the result includes a more recent timestamp; attach a generated summary to a designated "briefs" collection; and/or append an interaction event to a chronological message ledger. In some embodiments, the merge engine may apply transformation operators, such as normalization, data-type conversion, and/or semantic harmonization, to ensure structural compatibility between the existing context object and the incoming result. In an embodiment, the merge operation may complete atomically such that intermediate, partially merged states are not visible to downstream modules, thereby preserving context consistency for subsequent routing and agent-selection decisions.

With continued reference to FIG. 1, in further embodiments, updating the thread-level context object 122 may include generating a new version or snapshot of the context object to support auditability, rollback, lineage reconstruction, and multi-agent synchronization. In an embodiment, a version identifier may be incremented or computed as a cryptographic digest of the new context state. In some cases, system 100 may maintain a version tree or linear history of snapshots, each capturing the entirety of the context object or a compressed delta representing only changed fields. In an embodiment, snapshots may be stored in a versioned object store, a key-value database, a graph-based serialization layer, and/or a distributed ledger depending on system scalability requirements. In some embodiments, a snapshot may be created before applying the update to enable reversible updates; in others, system 100 may employ a "copy-on-write" strategy, in which only modified portions of the context object are duplicated. Version metadata may include, without limitation, timestamp information, agent identifiers, operation identifiers, and/or routing conditions 126 that triggered the update. These versioning mechanisms may allow system 100 to maintain continuity of the conversation thread 120 even when multiple agents execute operations asynchronously or in parallel.

Still referring to FIG. 1, in some embodiments, updating the thread-level context object 122 may include detecting and resolving conflicts between the existing context state and the incoming result. In some cases, conflicts may arise when the result attempts to update a field already modified by another agent, when two results propose incompatible interpretations of the same task or entity, and/or when a result violates a policy constraint encoded in the context object. In an embodiment, at least a processor 108 may execute a conflict-detection module that compares proposed updates against the current context state using timestamps, semantic comparison, constraint validation, and/or vector-space similarity thresholds. Upon detecting a conflict, system 100 may employ a resolution strategy, such as: prioritizing the update with the most recent timestamp; selecting the update with the highest confidence score; applying a hierarchical policy that assigns different precedence weights to different agents; and/or synthesizing a unified value using a learned merge-policy model. In further embodiments, unresolved conflicts may be tagged with ambiguity metadata and deferred to a supervisory agent or returned to the user for clarification. These conflict-resolution pathways may ensure that the context object remains coherent and trustworthy even in multi-agent environments where updates originate from distributed or unsynchronized processes.

In continued reference to FIG. 1, in yet further embodiments, updating the thread-level context object 122 may include writing updated values to one or more data structures optimized for multi-agent, multi-operation workflows. In an embodiment, the context object may be stored as a hierarchical key-value map, a JSON-like document structure, a graph of interconnected nodes, a tuple store, and/or a hybrid representation combining multiple structures. For example, tasks may be stored as graph nodes linked by dependency edges; user attributes may be stored as flat key-value pairs; and historical events may be maintained in an append-only list or log segment. In some embodiments, system 100 may employ a context index to accelerate retrieval of frequently accessed fields, and/or a semantic hashing layer to group related context entries for efficient update. In an embodiment, serialization formats may include JSON, CBOR, Protobuf, Avro, and/or domain-specific binary structures designed for rapid merge and diff operations. These data structures may allow the context object to scale as conversation threads grow in complexity and number, while preserving the ability of the processor to perform updates, merges, and routing evaluations with low latency.

With continued reference to FIG. 1, in an embodiment, at least a processor 108 may be configured to determine, as a function of the updated thread-level context object 168, a subsequent routing condition 162, wherein the subsequent routing condition 162 specifies a subsequent operation 164 and a target agent 166 to which the subsequent operation 164 is to be routed. For purposes of this disclosure, a "subsequent routing condition" is a decision structure generated after incorporation of the first result 144. In an embodiment, the structure may define (i) what additional action is required to advance the conversation thread 120 and (ii) which agent is most appropriate to perform that action. For purposes of this disclosure, a "subsequent operation" is any computational task, transformation, lookup, analysis, or workflow step that arises as a consequence of the updated context state. As non-limiting examples, a subsequent operation 164 may include generating a summary of updated client records, initiating a compliance validation step, checking the status of related tasks in a shared store, preparing a briefing for an advisor, and/or determining the next workflow transition within a protocol or journey. For purposes of this disclosure, a "target agent" is a software agent selected to perform the subsequent operation 164. This choice may be based on its capability profile 138, compliance constraints, domain specialization, and/or availability signals stored within system 100. In some embodiments, at least a processor 108 may evaluate the updated context object, including new state variables and provenance indicators, to infer next steps that logically follow from the prior operation, and may generate a routing structure that pairs each prospective subsequent operation 164 with an appropriate target agent 166. This approach may enable system 100 to adaptively sequence multi-agent workflows as new context becomes available, ensuring continuity and correctness of task progression across the conversation thread 120.

In further reference to FIG. 1, in an embodiment, at least a processor 108 may be configured to provide, as a function of the subsequent routing condition 162, at least a portion of the updated thread-level context object 168 to the target agent 166 specified in the subsequent routing condition 162. In an embodiment, providing at least a portion of the updated thread-level context object 168 may include generating a context view, context slice, and/or filtered subset 158 derived from the updated context object and tailored to the informational needs and access permissions of the target agent 166. In some embodiments, at least a processor 108 may identify fields relevant to the subsequent operation 164, apply policy constraints associated with the target agent's capability profile 138, and remove and/or redact fields that fall outside the agent's permissible data-access scope. As non-limiting examples, a target agent 166 configured to compute compliance risk may receive recent task completions, client attributes, and provenance indicators, while a target agent 166 configured to draft an advisor brief may receive conversational history, inferred user intent, and current workflow status. In certain embodiments, providing the portion may include serializing the context view into a machine-readable format such as JSON, Protobuf, and/or a domain-specific binary representation, and transmitting it to the target agent 166 through an authenticated message channel, function call, inter-process communication endpoint, and/or service invocation. Further, this process may be accomplished, without limitation, as earlier discussed in relation to the first agent 136. These context-provisioning mechanisms may ensure that each agent receives only the information necessary to perform its assigned operation while maintaining continuity and informational integrity across sequential stages of the multi-agent routing pipeline.

Still referring to FIG. 1, in an embodiment, the plurality of software agents 134 may include at least a second agent 170. For purposes of this disclosure, a "second agent" is any software agent that is distinct from the first agent 136. In this regard, "distinct" is regardless of whether the agents differ in implementation, capability profile 138, operational scope, model architecture, domain specialization, compliance permissions, and/or runtime environment. In some embodiments, the second agent may perform a complementary role to the first agent 136, such as executing downstream tasks that logically follow the first agent's operation, conducting validation or enrichment steps, and/or handling ancillary subtasks created during the first agent's processing. In other embodiments, the second agent may represent a specialized capability, such as document generation, compliance assessment, data retrieval, task coordination, or natural-language summarization, selected when system 100 determines that the next stage of the workflow requires competencies not associated with the first agent 136. In an embodiment, the distinction between the first agent 136 and the second agent may be determined dynamically as a function of the routing condition 126, capability manifests 156 stored in the agent registry 154, and contextual metadata included within the thread-level context object 122. This arrangement may allow system 100 to coordinate multi-step, multi-agent workflows in which different agents contribute discrete operations while preserving continuity of the conversation thread 120.

With further reference to FIG. 1, in an embodiment, at least a processor 108 may be configured to route a task generated by the first agent 136 to the at least a second agent 170 as a function of the thread-level context object 122. In an embodiment, routing a task may include, without limitation, identifying a task produced by the first agent 136, determining the appropriate next agent to execute that task, and transmitting the task, together with a relevant portion of the thread-level context object 122, to the second agent in accordance with system-defined routing logic. In some embodiments, a task generated by the first agent 136 may include, without limitation, a request to perform a downstream analysis, initiate a workflow step, validate a status value, retrieve a record, generate a draft artifact, and/or trigger a compliance check. In an embodiment, at least a processor 108 may evaluate the updated thread-level context object 168 to determine which capabilities, policy constraints, and/or role specializations are required to complete the task and may then select the second agent whose capability manifest 156 and access permissions satisfy those requirements. In some cases, routing the task may include constructing a task envelope containing the task specification, provenance metadata, an operation identifier, and/or a filtered context subset tailored to the second agent's access scope. In some embodiments, the routing operation may be performed through an authenticated message bus, an inter-agent invocation API, an asynchronous queue, and/or a direct inter-process communication channel. This routing mechanism may enable system 100 to chain operations across multiple agents while preserving contextual continuity, ensuring that information generated by one agent is seamlessly leveraged by subsequent agents within the conversation thread 120.

In further reference to FIG. 1, in some embodiments, routing a task from the first agent 136 to the second agent may include constructing a task envelope configured to encapsulate all information required for the receiving agent to perform its assigned operation. In an embodiment, a task envelope may include, without limitation, a task descriptor identifying the operation to be performed; the originating agent's identifier; a request identifier; timestamps; and/or a filtered portion of the thread-level context object 122 necessary for execution. In certain embodiments, the envelope may also include provenance metadata, priority indicators, compliance flags, confidence scores produced by upstream models, and/or routing annotations indicating dependencies among related tasks. In an embodiment, the envelope may be serialized in a structured format such as JSON, CBOR, XML, Protocol Buffers, and/or a domain-specific binary payload optimized for rapid multi-agent exchange. In further embodiments, the envelope may include integrity-protection elements, such as digital signatures or keyed hashes, enabling the receiving agent to verify authenticity prior to execution. Constructing the task envelope in this manner may provide a standardized, secure, and context-rich artifact that supports reliable inter-agent coordination.

Still referring to FIG. 1, in further embodiments, routing the task may include invoking the second agent using one or more inter-agent communication protocols configured to support asynchronous, synchronous, distributed, and/or local execution environments. In an embodiment, the invocation may occur through a message bus, a publish-subscribe event channel, a remote procedure call (RPC) framework, a gRPC streaming endpoint, an HTTP or RESTful API call, a WebSocket session, or an internal scheduling interface depending on system architecture. In some embodiments, agents may expose capability-specific endpoints that enforce schema validation and authentication checks before accepting a task envelope. In other embodiments, system 100 may use an orchestration layer that maintains agent availability, schedules task assignments, and ensures that routing respects load-balancing or throttling constraints. These invocation protocols may enable flexible deployment of agents across heterogeneous compute environments, including containerized microservices, serverless functions, on-device models, or remote computation clusters.

With continued reference to FIG. 1, in some embodiments, system 100 may implement failure-recovery logic to address situations in which routing a task to the second agent fails or the second agent is unable to complete the assigned operation. In an embodiment, failure conditions may include communication timeouts, agent unavailability, malformed task envelopes, capability mismatches, and/or conflicts detected between the incoming task and the second agent's policy constraints. Upon detecting such a condition, at least a processor 108 may initiate a recovery workflow that includes retrying the routing operation, selecting a fallback agent with equivalent or approximate capabilities, and/or re-queuing the task for delayed processing. In additional embodiments, system 100 may update the thread-level context object 122 with a failure indicator, generate a diagnostic entry in the audit log 174, and/or escalate the issue to a supervisory or human-in-the-loop agent for corrective action. These recovery pathways may ensure that multi-agent workflows maintain continuity and robustness, even in the presence of transient faults or unexpected behavior.

In further reference to FIG. 1, in some embodiments, agents may engage in subtask negotiation, in which the second agent may determine that completing the task requires additional subtasks and may dynamically solicit support from other agents. In such embodiments, the second agent may generate a set of subtasks and request capability manifests 156 from other agents that could satisfy specific sub-operations. In an embodiment, negotiation logic may include evaluating capability compatibility, compliance restrictions, data-access limitations, and/or resource constraints before delegating subtasks. In some implementations, subtask negotiation may be mediated by at least a processor 108 and/or routing layer, ensuring that all subtasks remain associated with the correct thread-level context object 122 and that context is preserved across nested agent interactions. This negotiation capability may enable system 100 to support complex, multi-stage workflows in which no single agent possesses all necessary skills, thereby enhancing modularity, scalability, and flexibility of the multi-agent orchestration pattern.

In continued reference to FIG. 1, in an embodiment, tasks generated by the first agent 136 and the at least a second agent 170 form a hierarchical task chain 172. For purposes of this disclosure, a "hierarchical task chain" is an ordered or partially ordered collection of tasks in which one or more tasks depend on, derive from, or are conditioned upon the output of upstream tasks. In some embodiments, the hierarchical task chain 172 may be structured such that a parent task is decomposed into one or more child tasks, each requiring execution by agents possessing different capabilities, policy scopes, and/or operational specializations. In other embodiments, the hierarchical task chain 172 may represent a branching workflow in which multiple tasks can execute in parallel, converge into a shared downstream task, or trigger additional subtasks as new context becomes available. In an embodiment, the hierarchical structure may be explicit, as in a dependency graph, directed acyclic graph (DAG), or linked task tree, and/or implicit, based on logical relationships inferred from the thread-level context object 122, agent-generated metadata, and/or workflow templates encoded within the system. Regardless of representation, the hierarchical task chain 172 may enable coordinated multi-agent execution where tasks produced at different stages of the conversation thread 120 are sequenced, routed, and resolved while preserving contextual continuity and respecting compliance or capability constraints.

With further reference to FIG. 1, in some embodiments, the hierarchical task chain 172 may be generated explicitly by one or more orchestration modules or implicitly by one or more models trained to infer task relationships from context. For example, a task-planning module may receive the updated thread-level context object 168 and the current routing condition 126 and may decompose a high-level objective into a sequence or graph of subtasks based on workflow templates, domain rules, and/or advisor-specific protocols. In certain embodiments, a machine-learning model, such as a sequence planner, graph neural network, or large language model, may be trained on historical multi-agent interaction traces to predict which subtasks typically follow a given operation and which agents are most compatible with each subtask. In additional embodiments, system 100 may maintain a knowledge graph that encodes relationships between task types, agent capabilities, data domains, and/or compliance constraints. In an embodiment, at least a processor 108 may traverse this knowledge graph to construct or refine the hierarchical task chain 172, identifying compatible downstream tasks and agents while ensuring that dependencies, ordering constraints, and policy requirements are satisfied. Through these mechanisms, the hierarchical task chain 172 can be synthesized, expanded, and/or adjusted dynamically as the conversation thread 120 evolves and new results are incorporated into the thread-level context object 122.

Still referring to FIG. 1, in an embodiment, at least a processor 108 may be configured to route the tasks within the hierarchical task chain 172 as a function of the thread-level context object 122. For purposes of this disclosure, routing tasks within the hierarchical task chain 172 may include determining the appropriate execution sequence, selecting the target agent 166 for each task based on capability requirements and policy constraints, and propagating the relevant portion of the thread-level context object 122 to each agent as they become responsible for their respective tasks. In some embodiments, at least a processor 108 may examine dependency relationships encoded within the hierarchical task chain 172, such as parent-child links, prerequisite conditions, and/or ordering constraints, to determine when a task is eligible for execution. In an embodiment, at least a processor 108 may then evaluate the updated thread-level context object 168 to identify which capabilities, compliance attributes, domain-specific information, and/or operational states are relevant to each task. Based on this evaluation, at least a processor 108 may select the appropriate agent from the agent registry 154 and generate a routing directive that includes a filtered subset 158 of the context object tailored to that agent's role. In further embodiments, routing may be dynamic, where at least a processor 108 re-evaluates the hierarchical task chain 172 in response to new information inserted into the context object or in response to outcomes produced by earlier tasks, thereby enabling adaptive reordering, task expansion, or task cancellation. In additional embodiments, the routing process may employ one or more trained models, such as reinforcement-learning policies, graph traversal models, and/or dependency-resolution networks, to determine optimal task sequencing and agent assignment patterns. Through these mechanisms, system 100 may ensure that multi-step workflows progress coherently across agents, maintaining contextual continuity and honoring logical and operational dependencies within the hierarchical task chain 172.

With continued reference to FIG. 1, in some embodiments, the model used to determine routing decisions within the hierarchical task chain 172 may be trained using historical multi-agent interaction data, workflow execution traces, and/or annotated examples of correct task ordering and agent assignment. In an embodiment, training data may include, without limitation: sequences of prior conversation threads paired with the tasks that were successfully completed; agent-capability pairings that resulted in valid outputs; dependency graphs showing relationships between tasks; compliance outcomes associated with specific routing paths; and/or failure cases in which routing decisions required correction or escalation. In an embodiment, the input to such a model may include a structured representation of the current thread-level context object 122, one or more candidate tasks extracted from the hierarchical task chain 172, capability manifests 156 of available agents, and/or any policy constraints applicable to the task or domain. In an embodiment, the output of the model may include a predicted next task, a ranked list of viable agents for that task, a sequencing recommendation, and/or a confidence score associated with each routing option. In some embodiments, the model may employ a graph neural network trained to embed task relationships, a transformer-based architecture trained to predict next-task transitions, and/or a reinforcement-learning policy optimized to maximize downstream task success or minimize routing corrections. In some cases, retraining may occur periodically as new agents are added, new task types become available, domain workflows evolve, or drift is detected between predicted routing decisions and observed real-world execution patterns. These training pathways enable the routing model to adapt to the dynamic, multi-agent environment and maintain reliable task orchestration over time.

In further reference to FIG. 1, in some embodiments, system 100 may include one or more governance modules configured to supervise and regulate interactions among the plurality of software agents 134. Such governance mechanisms may enforce system-wide policies, prioritize safety or compliance requirements, and ensure that agents operate within their prescribed capability scopes. In an embodiment, the governance module may monitor agent-generated outputs, track inter-agent communications, and/or validate whether each routing decision adheres to capability constraints and role-specific rules encoded in the agent registry 154. In certain embodiments, governance may include dynamic capability revocation, throttling of agent invocations based on system load or trust levels, and/or restricting access to sensitive portions of the thread-level context object 122. In further embodiments, governance modules may rely on learned policies, trained on historical agent performance, compliance outcomes, or error patterns, to intervene when an agent demonstrates inconsistent behavior, produces anomalous results, or deviates from expected task sequences. These governance mechanisms help maintain operational integrity and safety within the multi-agent orchestration environment.

Still referring to FIG. 1, in further embodiments, system 100 may include a compliance-filtering module configured to ensure that all agent operations conform to domain-specific regulatory, contractual, or organizational requirements. In an embodiment, compliance filtering may occur at multiple stages of the workflow, including during routing-condition evaluation, context-subset generation, and result integration into the thread-level context object 122. In some cases, the compliance module may examine field-level access restrictions, validate that sensitive data is not included in context subsets transmitted to agents lacking proper authorization, and/or enforce policy constraints encoded in agent capability manifests 156. In some embodiments, compliance filtering may include rule-based logic, constraint solvers, and/or machine-learning classifiers trained to detect policy violations, anomalous access patterns, or improper propagation of restricted information. The module may also, in some embodiments, annotate context fields with compliance metadata and/or generate compliance events that are inserted into the audit log 174 for later review. Through these mechanisms, system 100 may ensure that multi-agent workflows remain aligned with privacy, security, and regulatory requirements throughout the lifecycle of the conversation thread 120.

In continued reference to FIG. 1, in yet further embodiments, system 100 may include diagnostic tools configured to monitor performance, detect anomalies, and/or support debugging of the multi-agent routing pipeline. In an embodiment, diagnostic tools may track latency associated with each agent call, measure error rates or failure frequencies across agent classes, and/or identify routing patterns that correlate with downstream issues or inefficiencies. In some embodiments, the diagnostic system may generate visualizations, such as execution graphs, agent-handoff timelines, and/or context-diff summaries, to assist developers or administrators in understanding how system 100 processes tasks across the hierarchical task chain 172. In additional embodiments, diagnostic modules may employ machine-learning models trained to detect deviations from expected patterns of agent behavior, for example, unusually long execution times, inconsistent outputs, or cycles in routing graphs that indicate improper task decomposition. Upon detecting anomalies, the diagnostic system may trigger alerts, record detailed traceback metadata, initiate fallback routing pathways, and/or temporarily disable agents that appear to be malfunctioning. These diagnostic tools may provide transparency, maintainability, and resilience across complex multi-agent workflows.

In further reference to FIG. 1, in an embodiment, at least a processor 108 may be configured to generate an audit log 174 comprising entries indicating at least one of a selected agent, an operation routed to the selected agent, and/or an update to the thread-level context object 122. For purposes of this disclosure, an "audit log" is a tamper-evident record that captures chronological metadata. In an embodiment, the metadata may describe the execution of tasks, routing decisions, agent actions, and/or context updates occurring within a conversation thread 120. In an embodiment, the audit log 174 may be stored in any suitable format, including a structured event ledger, a secure time-stamped journal, a cryptographically chained sequence of log blocks, and/or a distributed append-only store. For purposes of this disclosure, an "entry" is a discrete record within the audit log 174.

The entry may include one or more fields that describe a specific event, such as an agent selection decision, a routing directive issued to an agent, the invocation and/or completion of a task, and/or the modification of a field in the thread-level context object 122. As non-limiting examples, an entry may include a timestamp, a thread identifier, the identifier of the selected agent, a routing condition identifier, a context-diff summary, a hash of the context subset transmitted to the agent, a provenance token associated with the result, and/or a compliance annotation. In some embodiments, each entry may be cryptographically linked to a preceding entry to prevent retroactive modification and to support end-to-end verification and reconstruction of system activity. Through these mechanisms, the audit log 174 may enable transparency, traceability, and post hoc analysis of multi-agent orchestration workflows.

With further reference to FIG. 1, in some embodiments, generating an audit log 174 may include executing an audit-entry construction pipeline configured to produce validated, schema-conforming entries for every event instrumented within the multi-agent workflow. In an embodiment, at least a processor 108 may assemble each entry by collecting event metadata, including the event type, associated thread identifier, relevant agent identifiers, routing conditions 126, task descriptors, and pre- and post-update context hashes, and encoding the entry into a predefined event schema. In certain embodiments, system 100 may apply validation procedures prior to committing the entry to the audit log 174, such as verifying the structural integrity of the entry, ensuring that mandatory metadata fields are present, confirming that timestamps fall within acceptable tolerances, and/or checking that referenced agent and task identifiers correspond to valid registry entries. Entry validation may also include enforcing sequence ordering rules, such as requiring that a "task-completed" entry cannot be logged unless a corresponding "task-invoked" entry exists earlier in the log. These validation steps may ensure that the audit log 174 maintains a consistent and accurate representation of system activity.

Still referring to FIG. 1, in further embodiments, the audit log 174 may incorporate one or more cryptographic mechanisms to ensure tamper-evident integrity. For example, each entry may contain a hash of its own content and a reference hash to the preceding entry, forming a hash-chained ledger that prevents alteration of historical entries without invalidating the chain. In some embodiments, entries may be signed using private keys associated with system 100, individual agents, and/or specific routing modules, enabling system 100 to verify the authenticity and origin of each logged event. Additional embodiments may include generating Merkle trees over groups of entries to support efficient verification of batched log segments and/or enabling distributed verification across nodes in a federated or multi-tenant deployment. These cryptographic protections may ensure that the audit log 174 provides a trustworthy record suitable for compliance review, forensic analysis, and high-assurance operational monitoring.

With continued reference to FIG. 1, in yet further embodiments, the audit log 174 may be maintained using one or more storage architectures optimized for durability, scalability, and secure retrieval. For example, the audit log 174 may be stored as an append-only file on local storage, a write-optimized database such as a log-structured merge (LSM) tree store, a versioned object store, and/or a distributed ledger accessible across multiple nodes. In some embodiments, system 100 may employ tiered storage, wherein recent entries are stored in fast-access memory or SSD-backed logs for rapid retrieval and older entries are migrated to archival cold storage. Other embodiments may replicate the audit log 174 across redundant nodes using consensus protocols to ensure high availability and resilience against data loss. Storage systems may also support indexed retrieval, enabling at least a processor 108 or administrative tools to search audit entries by thread identifier, agent identifier, timestamp, task type, or routing condition 126. These storage mechanisms may ensure that the audit log 174 remains accessible, performant, and compliant with long-term retention requirements.

In further reference to FIG. 1, in additional embodiments, the audit log 174 may serve as a training and analytics substrate for improving system performance, reliability, and compliance alignment. In an embodiment, machine-learning models may be trained on historical audit log 174 entries to detect anomalous routing decisions, identify agents exhibiting inconsistent performance, learn optimal routing patterns, or refine merge-policy models for context updates. For example, a sequence model may learn common task-ordering patterns within hierarchical task chains 172, while a compliance-prediction model may learn to detect early signals of policy violations before they propagate through the system. In some embodiments, audit log 174 data may be preprocessed into feature vectors representing agent interactions, context transitions, or multi-step workflows, and used to train reinforcement-learning policies governing routing decisions. In an embodiment, system 100 may also perform retrospective analysis of audit entries to identify bottlenecks, misrouted tasks, frequent agent handoff failures, or recurring conflict-resolution scenarios. These audit-driven analytics may allow system 100 to continually adapt by leveraging real-world operational data captured during multi-agent execution.

Aspects of the present disclosure relate to systems and methods for context-aware, multi-agent orchestration within conversational computing environments, particularly those used by professionals such as financial advisors. In an embodiment, a user may issue natural-language operational requests, such as inquiries about client status or workflow progress, while interacting within a live workspace that includes protocol templates, journey records, or family-planning canvases. In an embodiment, system 100 may include a chatbot or conversational interface that indexes information about individuals, generates briefs, and enables users to create or assign tasks directly from chat. Upon receiving a request, a routing service may evaluate conversational intent, applicable compliance constraints, and agent-specific capability profiles 138 to determine which software agent should perform the requested operation. Further in some cases, system 100 may maintain a thread-level context object 122 that is shared, serialized, and passed among agents, enabling the results of each operation to persist across subsequent steps so that no information is lost as work transitions from agent to agent. In an embodiment, agents may create subtasks for one another, update shared stores, and/or write results back into advisor workflows while system 100 ensures that each agent receives only the context necessary for its permitted role. A chat-side panel may display the active agent, handoff history, downstream plans, and rationale for routing decisions, while an audit log 174 captures detailed metadata describing agent actions, context updates, and routing transitions to support compliance verification and professional oversight. Although described in connection with advisor-centric workflows, the disclosed architecture may be adapted to other domains that require secure, role-specific multi-agent collaboration under varying privacy or regulatory regimes.

Referring now to FIG. 2, a user interface system 200 is schematically illustrated. User interface system 200 may configure a computing device 212 to configure a remote device 204 to perform display, input, and output functions, without limitation of a user interface. According to some embodiments, a user interface 208 may be communicative with a computing device 212, such as computing device as described above, that is configured to operate a chatbot. In some cases, user interface 208 may be local to computing device 212. Alternatively or additionally, in some cases, user interface 208 may remote to computing device 212 and communicative with the computing device 212, by way of one or more networks, such as without limitation the internet. Alternatively or additionally, user interface 208 may communicate with user device using telephonic devices and networks, such as without limitation fax machines, short message service (SMS), or multimedia message service (MMS). Commonly, user interface 208 communicates with computing device 212 using text-based communication, for example without limitation using a character encoding protocol, such as American Standard for Information Interchange (ASCII). Textual communication may be made between two or more users operating user devices, each of which may be configured by computing device to implement user interface. Two or more users may communicate with one another via user interface instances; alternatively or additionally, user interface 208 may conversationally interface using a chatbot, by way of at least a submission 216, from the user interface 208 to the chatbot, and a response 220, from the chatbot to the user interface 208. In many cases, one or both of submission 216 and response 220 are text-based communication. Alternatively or additionally, in some cases, one or both of submission 216 and response 220 are audio-based communication.

Continuing in reference to FIG. 2, a submission 216 once received by computing device 212 operating a chatbot, may be processed by circuitry and/or a processor, for instance and without limitation as described above. In some embodiments, processor processes a submission 216 using one or more of keyword recognition, pattern matching, and natural language processing. In some embodiments, processor employs real-time learning with evolutionary algorithms. In some cases, processor may retrieve a pre-prepared response from at least a storage component 224, based upon submission 216. Alternatively or additionally, in some embodiments, processor communicates a response 220 without first receiving a submission 216, thereby initiating conversation. Alternatively or additionally, processor may input user-submitted or other text as an input and may output a textual response using one or more generative artificial intelligence processes and/or components, such as without limitation an LLM or other generative model as described above. In some cases, processor communicates an inquiry to user interface 208; and the processor is configured to process an answer to the inquiry in a following submission 216 from the user interface 208. In some cases, an answer to an inquiry present within a submission 216 from a user device may be used by computing device 104 as an input to another function; inputs may include without limitation, composition data, pecuniary goal data, data suitable for use as survey data, or the like. Inputs generated by a chatbot may be input, without limitation, to any process, module, component, or other element described in this disclosure that can accept an input.

Still referring to FIG. 2, apparatus may, for instance, use a client-side program to configure a user device to display data and/or to perform event handling of user inputs; such display may be implemented, without limitation, as a graphical user interface. For instance, and without limitation, apparatus may display any output of any authentication process, any output of computation of predicted message, any output of any process used in computation of predicted message, any output of any authorization process, and/or any output of processes used to perform authorization. Apparatus and/or circuitry may configure a user device to display one or more event handler graphics 240*a-n*. As used in this disclosure, an "event handler graphic" is a graphical element with which a user of remote device may interact to enter data, for instance and without limitation for a search query or the like as described in further detail below. An event handler graphic 240*a-n* may include, without limitation, a button, a link, a checkbox, a text entry box and/or window, a drop-down list, a slider, or any other event handler graphic 240*a-n* that may occur to a person skilled in the art upon reviewing the entirety of this disclosure. An "event handler," as used in this disclosure, is a module, data structure, function, and/or routine that performs an action on remote device in response to a user interaction with event handler graphic 240*a-n*. For instance, and without limitation, an event handler 244 may record data corresponding to user selections of previously populated fields such as drop-down lists and/or text auto-complete and/or default entries, data corresponding to user selections of checkboxes, radio buttons, or the like, potentially along with automatically entered data triggered by such selections, user entry of textual data using a keyboard, touchscreen, speech-to-text program, or the like. Event handler 244 may generate prompts for further information, may compare data to validation rules such as requirements that the data in question be entered within certain numerical ranges, and/or may modify data and/or generate warnings to a user in response to such requirements. Event handler 244 may convert data into expected and/or desired formats, for instance such as date formats, currency entry formats, name formats, or the like. Event handler 244 may transmit data from remote device to apparatus and/or circuitry.

In an embodiment, and further referring to FIG. 1, event handler 244 may include a cross-session state variable. As used herein, a "cross-session state variable" is a variable recording data entered on remote device during a previous session. Such data may include, for instance, previously entered text, previous selections of one or more elements as described above, or the like. For instance, cross-session state variable data may represent a search a user entered in a past session. Cross-session state variable may be saved using any suitable combination of client-side data storage on remote device and server-side data storage on apparatus and/or circuitry; for instance, data may be saved wholly or in part as a "cookie" which may include data or an identification of remote device to prompt provision of cross-session state variable by apparatus and/or circuitry, which may store the data on apparatus and/or circuitry. Alternatively, or additionally, apparatus and/or circuitry may use login credentials, device identifier, and/or device fingerprint data to retrieve cross-session state variable, which apparatus and/or circuitry may transmit to remote device. Cross-session state variable may include at least a prior session datum. A "prior session datum" may include any element of data that may be stored in a cross-session state variable. Event handler graphic 240*a-n* may be further configured to display the at least a prior session datum, for instance and without limitation auto-populating user query data from previous sessions.

With continued reference to FIG. 2, in one or more embodiments, users may utilize instances of user interface system 200 to exchange text messages with each other. User interface 208 may include functionality to configure each or any remote device to display a chat window 236. A chat window 236 may include a window or field that displays text generated by one or more users and/or chatbot outputs, and/or a window or field for entry of textual data by a user; windows and/or fields for display and entry may be separate. An event handler graphic 240*a-n* and/or event handler 244 may transmit textual entries and/or display such entries, for instance and without limitation when a user "posts" such entries to make them visible to a chatbot and/or another user.

Figure 3:
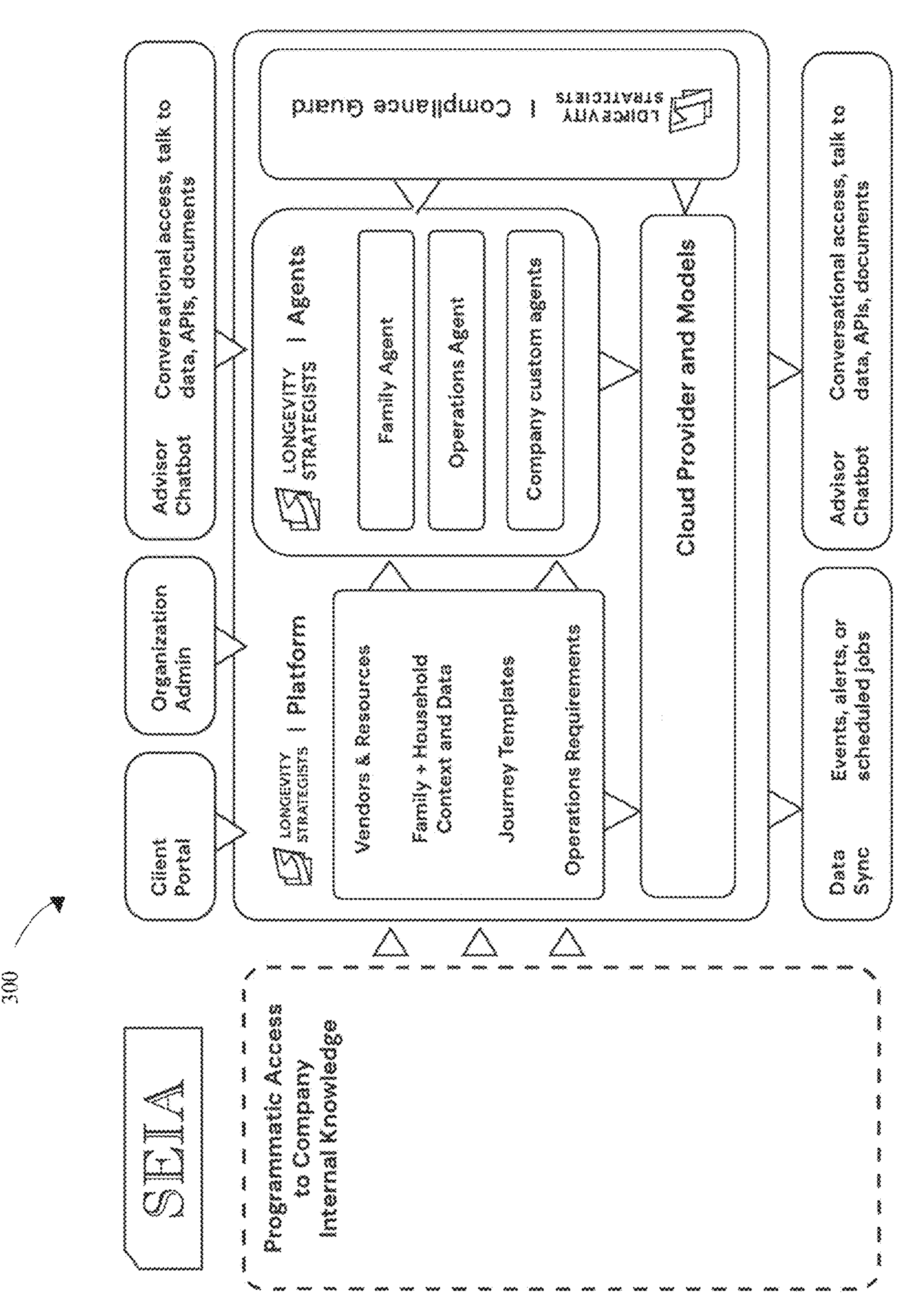
FIG. 3 illustrates an exemplary diagram of a multi-layer artificial intelligence system.

Referring now to FIG. 3, illustrated is an exemplary embodiment of a multi-layer artificial intelligence system 300 configured to support coordinated advisor workflows using the context-preserving agent-routing architecture and thread-level context-serialization mechanisms described throughout this application. System 300 demonstrates how conversational inputs, structured organizational data, policy constraints, and autonomous software agents interface within a unified computational environment to maintain coherent state across asynchronous operations.

As shown on the left side of FIG. 3, the system may incorporate a programmatic access layer through which internal company knowledge, such as operational policies, workflow rules, resource catalogs, and historical execution data, may be retrieved or incorporated into the system's shared context. In some embodiments, this internal knowledge may contribute to the thread-level context object, described in this application, by supplying policy constraints, entity definitions, and workflow requirements used by the routing engine.

With continued reference to FIG. 3, in an embodiment, system 300 may further include a plurality of user-facing interaction surfaces, including a client portal, organization-administrator interface, and an advisor-chatbot interface. In some embodiments, the advisor-chatbot interface may operate as the entry point for receiving user inputs that are subsequently transformed into requests, mapped to a conversation thread, and processed using the request-extraction and intent-determination techniques disclosed herein. For example, conversational instructions received through this interface may be parsed, embedded, and normalized into structured request objects suitable for downstream routing.

In further reference to FIG. 3, the illustrated Platform layer serves as a primary source of structured operational context. In the embodiment shown, the Platform layer provides access to (i) vendors and resources, (ii) family and household context data, (iii) journey templates, and (iv) operations requirements. These elements may be incorporated into or referenced by the thread-level context object so that downstream agents receive accurate workflow state, entity references, and/or constraint metadata when executing operations. In some embodiments, the Platform layer may act as the data backbone that the routing engine consults when evaluating capability requirements, workflow constraints, or policy-encoded conditions.

Still referring to FIG. 3, as illustrated, adjacent to the Platform layer is the Agents layer, which may include a Family Agent, an Operations Agent, and one or more custom agents associated with an organization. Consistent with the multi-agent orchestration described in this application, each agent in FIG. 3 may possess a defined capability profile and may receive only the subset of the thread-level context object required for its operation. Routing decisions, in some cases, performed using the intent representation and policy-constraint evaluation processes disclosed herein, may determine which agent is selected to process a given request. As shown, a Compliance Guard may be used to enforce policy restrictions, capability boundaries, and workflow-ordering requirements before agent execution, thereby ensuring that routing remains consistent with the policies encoded in the thread-level context object.

In continued reference to FIG. 3, beneath the Platform and Agents layers, the illustrated system 300 includes a Cloud Provider and Models layer, which may host compute resources, language models, retrieval models, embedding stores, and other machine-learning components used to execute the operations described in this application. In some embodiments, this layer supports the generation of intent embeddings, parameter extraction, context serialization, similarity evaluations, and model-driven routing logic. The cloud layer may also facilitate serialization and deserialization of the thread-level context object to ensure persistence across asynchronous agent handoffs. At the lower portion of FIG. 3, system 300 may include data-synchronization services, event/alert pipelines, and scheduled-job modules. These components may emit events that create or update requests, thereby triggering the request-reception and context-alignment processes described in the present application. In some embodiments, these background operations may also update the thread-level context object when system-initiated tasks (rather than user-initiated inputs) generate changes to workflow state.

In operation, the architecture of FIG. 3 demonstrates how the disclosed system may maintain continuous, deterministic context across multi-agent interactions. User instructions processed through the advisor-chatbot interface may be associated with a conversation thread, parsed into structured request objects, evaluated for intent and policy constraints, and routed to appropriate agents. As each agent executes its task, system 300 may update the thread-level context object and persist it, often by serializing the context into durable storage, thereby ensuring that subsequent agents operate on a coherent, policy-compliant, and up-to-date representation of the conversation state. Accordingly, FIG. 3 illustrates not only a multi-layer AI architecture but also a specific embodiment of the context-preserving agent-routing system described in this application, showing how platform data, conversational inputs, machine-learning models, and autonomous agents interact through the thread-level context-serialization pipeline to support reliable, compliant, and centralized execution of complex advisor workflows.

Figure 4:
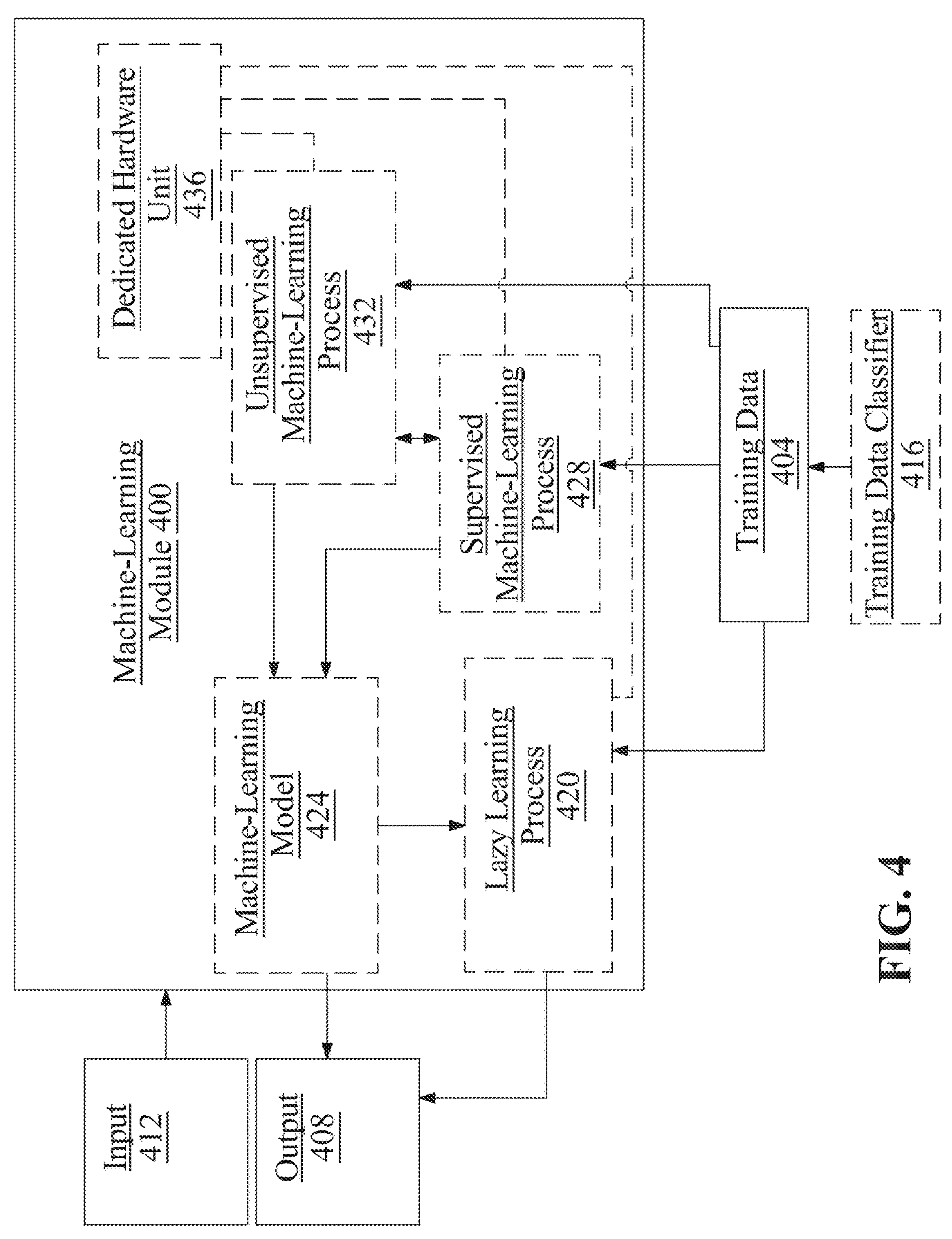
FIG. 4 is a block diagram of an exemplary machine-learning module.

Referring now to FIG. 4, an exemplary embodiment of a machine-learning module 400 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 404 to generate an algorithm instantiated in hardware or software logic, data structures, and/or functions that will be performed by a computing device/module to produce outputs 408 given data provided as inputs 412; this is in contrast to a non-machine learning software program where the commands to be executed are determined in advance by a user and written in a programming language.

Still referring to FIG. 4, "training data," as used herein, is data containing correlations that a machine-learning process may use to model relationships between two or more categories of data elements. For instance, and without limitation, training data 404 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 404 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 404 according to various correlations; correlations may indicate causative and/or predictive links between categories of data elements, which may be modeled as relationships such as mathematical relationships by machine-learning processes as described in further detail below. Training data 404 may be formatted and/or organized by categories of data elements, for instance by associating data elements with one or more descriptors corresponding to categories of data elements. As a non-limiting example, training data 404 may include data entered in standardized forms by persons or processes, such that entry of a given data element in a given field in a form may be mapped to one or more descriptors of categories. Elements in training data 404 may be linked to descriptors of categories by tags, tokens, or other data elements; for instance, and without limitation, training data 404 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 4, training data 404 may include one or more elements that are not categorized; that is, training data 404 may not be formatted or contain descriptors for some elements of data. Machine-learning algorithms and/or other processes may sort training data 404 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 404 to be made applicable for two or more distinct machine-learning algorithms as described in further detail below. Training data 404 used by machine-learning module 400 may correlate any input data as described in this disclosure to any output data as described in this disclosure. As a non-limiting illustrative example, input training samples may include natural-language conversational instructions, historical thread-level context objects, and prior agent-selection decisions, while corresponding output samples may include intent representations, routing conditions, and selected agents for those historical requests.

Further referring to FIG. 4, training data may be filtered, sorted, and/or selected using one or more supervised and/or unsupervised machine-learning processes and/or models as described in further detail below; such models may include without limitation a training data classifier 416. Training data classifier 416 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 400 may generate a classifier using a classification algorithm, defined as a processes whereby a computing device and/or any module and/or component operating thereon derives a classifier from training data 404. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 416 may classify elements of training data to identify sub-populations of conversational requests, such as compliance-related queries, operational workflow instructions, or client-specific status checks, that represent distinct routing patterns or agent-handling behaviors suitable for training specialized intent or routing models.

Still referring to FIG. 4, a computing device may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A)P(A)\div P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device may then calculate a likelihood table by calculating probabilities of different data entries and classification labels. A computing device may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 4, a computing device may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 4, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below.

Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 4, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. A computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 4, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 4, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 4, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 4, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 4, computing device, processor, and/or module may down-sample elements of a training example to a desired lower number of data elements. As a non-limiting example, a high pixel count image may have 256 pixels, however a desired number of pixels may be 128. Processor may downsample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 4, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 4, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $$X_{max}:X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation σ of a set or subset of values:

$$X_{new} = \frac{X - X_{mean}}{\sigma}.$$

Scaling may be performed using a median value of a a set or subset $X_{median}$ and/or interquartile range (IQR), which represents the difference between the $25^{th}$ percentile value and the $50^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Further referring to FIG. 4, computing device, processor, and/or module may be configured to perform one or more processes of data augmentation. "Data augmentation" as used in this disclosure is addition of data to a training set using elements and/or entries already in the dataset. Data augmentation may be accomplished, without limitation, using interpolation, generation of modified copies of existing entries and/or examples, and/or one or more generative AI processes, for instance using deep neural networks and/or generative adversarial networks; generative processes may be referred to alternatively in this context as "data synthesis" and as creating "synthetic data." Augmentation may include performing one or more transformations on data, such as geometric, color space, affine, brightness, cropping, and/or contrast transformations of images.

Still referring to FIG. 4, machine-learning module 400 may be configured to perform a lazy-learning process 420 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 404. Heuristic may include selecting some number of highest-ranking associations and/or training data 404 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 4, machine-learning processes as described in this disclosure may be used to generate machine-learning models 424. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 424 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 424 may be generated by creating an artificial neural network, such as a convolutional neural network comprising an input layer of nodes, one or more intermediate layers, and an output layer of nodes. Connections between nodes may be created via the process of "training" the network, in which elements from a training data 404 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 4, machine-learning algorithms may include at least a supervised machine-learning process 428. At least a supervised machine-learning process 428, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include inputs as described above as inputs, outputs as described above as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 404. Persons skilled in the art, upon reviewing the entirety of this disclosure, will be aware of various possible variations of at least a supervised machine-learning process 428 that may be used to determine relation between inputs and outputs. Supervised machine-learning processes may include classification algorithms as defined above.

With further reference to FIG. 4, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Continuing to refer to FIG. 4, evaluation of error function and/or other comparison results may include comparison of each of error function and/or other comparison results to a maximum single error threshold; in other words, a criterion of evaluation may include performing iterative retraining if any single comparison and/or error function output exceeds maximum single error threshold or if a count of single comparison and/or error function outputs exceeding single error threshold exceeds a threshold number and/or proportion of overall error function and/or other comparison results. Alternatively or additionally, evaluation of error function and/or other comparison results may include comparison of an aggregated plurality of error function and/or other comparison results to an aggregate error threshold; in other words, a criterion of evaluation may include performing iterative retraining if a result of averaging or otherwise aggregating a plurality such as some or all evaluated function and/or other comparison results exceeds aggregate error threshold. Aggregation may be performed in any manner of aggregation described in this disclosure and/or any combination thereof. Criteria for evaluations may be evaluated separately such that failing any one criterion causes iterative retraining; alternatively or additionally evaluation results may be combined according to one or more logical or other rules.

As a non-limiting, illustrative example, and still referring to FIG. 4, where outputs to be compared by error function are numerical values, error function may include subtraction of one from the other to derive an absolute value and/or mean squared error. Where outputs and/or training examples are represented as a binary classification, an error function may include a hinge loss function, sigmoid cross entropy loss function, weighted cross entropy loss function, or the like. Where output and/or exemplary output in a training set is a classification to three or more values, error function may include a softmax cross entropy loss function, a sparse cross entropy loss function, a Kullback-Leibler divergence loss function, or the like. Where both retaining and training with include supervised training, retraining may use a different error function, different weight update functions and/or parameters, or the like than in the training stage. For instance, and without limitation, when a previous iterative retraining process included training using examples from until a first convergence threshold and/or epsilon value and/or neighborhood is met, a subsequent iterative retraining process may include a lower convergence threshold, a smaller value of epsilon, or the like. Iterative retraining may include using one or more examples that were not used in any previous training and/or retraining process; for instance, where convergence was initially and/or previously achieved using a first subset of examples a subsequent retraining process may use examples from a second subset of examples, which may be wholly disjoint from first subset and/or have one or more elements that are not found in first subset.

Still referring to FIG. 4, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 4, machine learning processes may include at least an unsupervised machine-learning processes 432. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 432 may not require a response variable; unsupervised processes 432 may be used to find interesting patterns and/or inferences between variables, to determine a degree of correlation between two or more variables, or the like.

Still referring to FIG. 4, machine-learning module 400 may be designed and configured to create a machine-learning model 424 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 4, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 4, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 4, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 4, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 4, one or more processes or algorithms described above may be performed by at least a dedicated hardware unit 436. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 436 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 436 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 436 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 5:
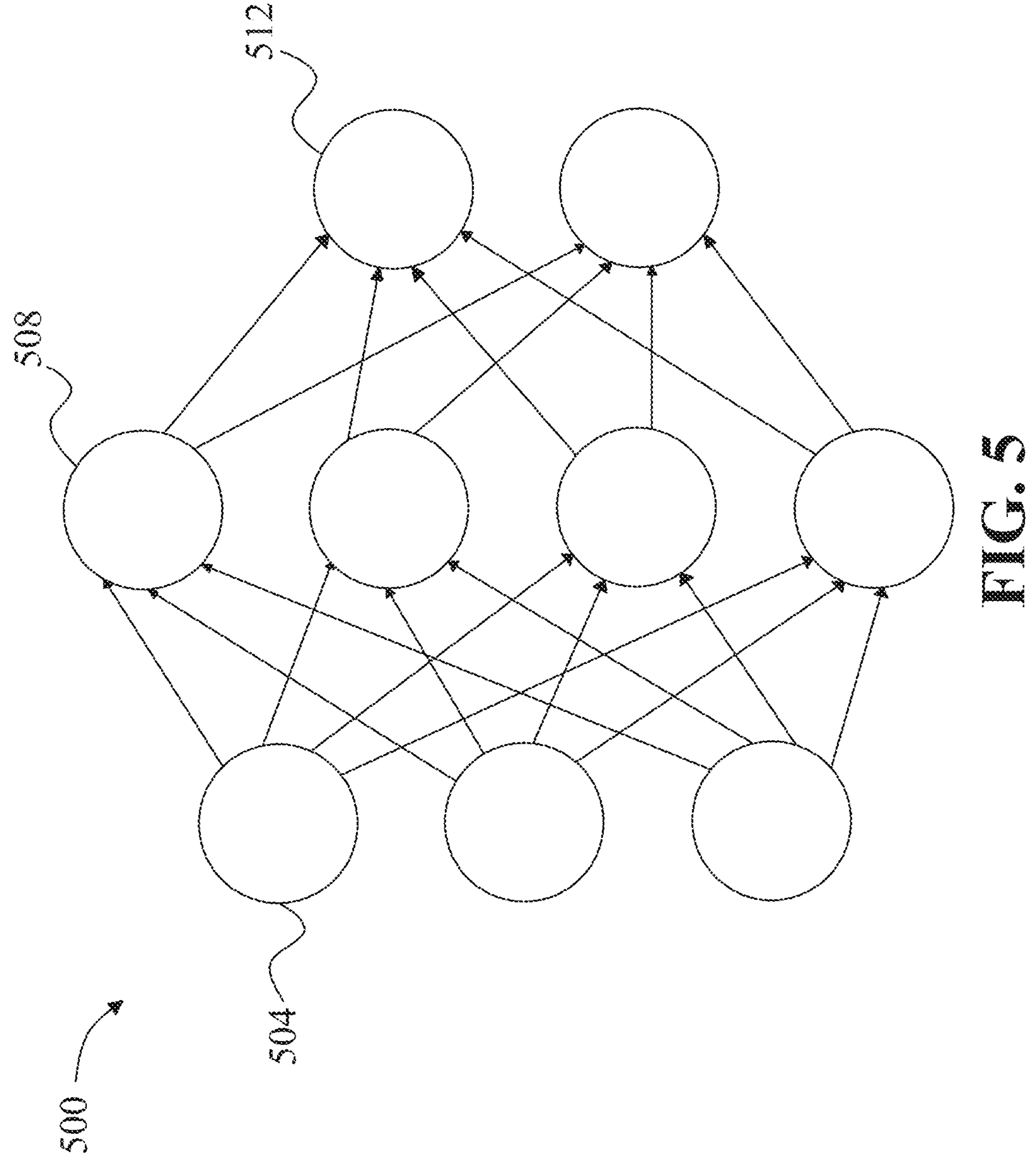
FIG. 5 is a diagram of an exemplary embodiment of a neural network.

Referring now to FIG. 5, an exemplary embodiment of neural network 500 is illustrated. A neural network 500 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 504, one or more intermediate layers 508, and an output layer of nodes 512. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 6:
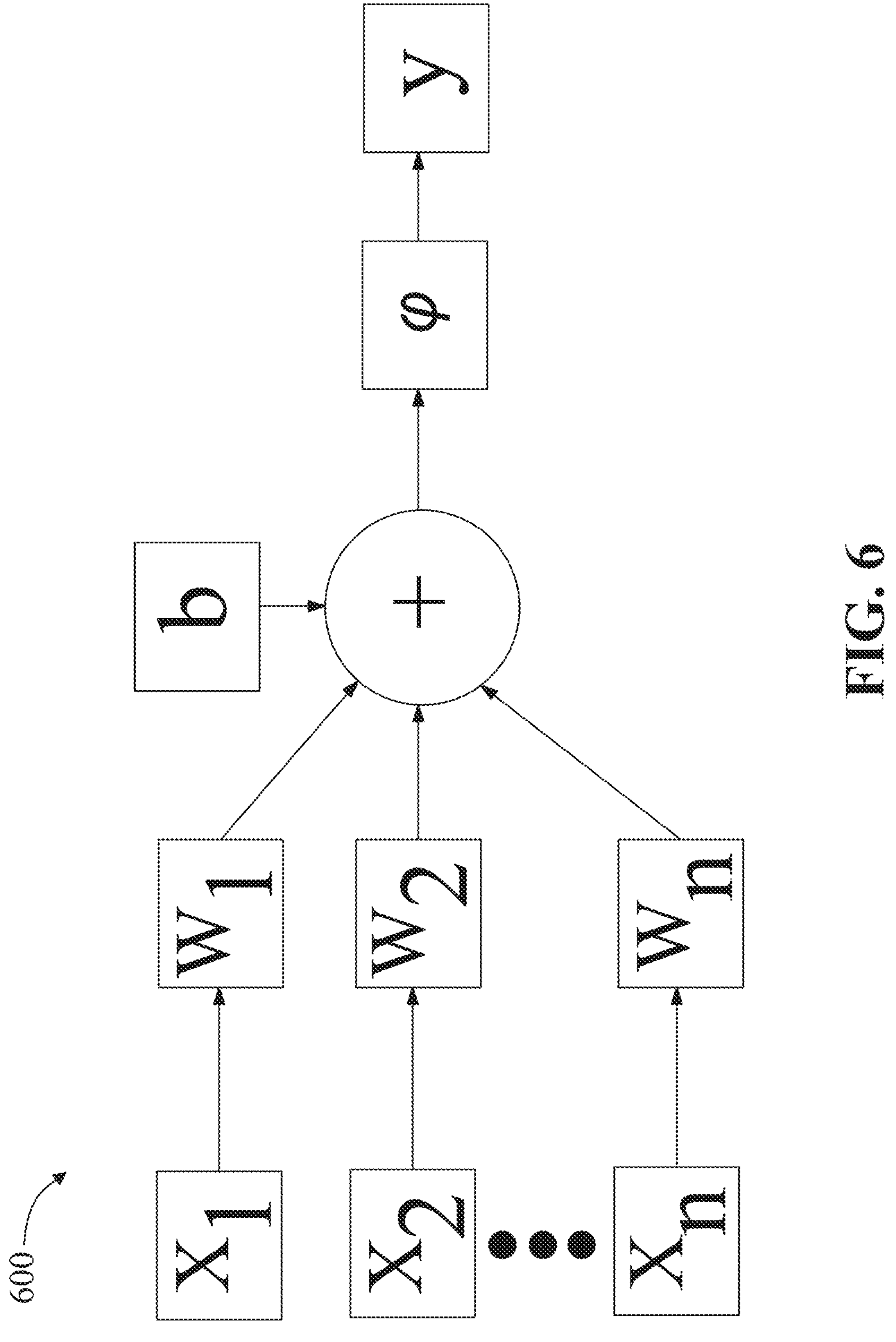
FIG. 6 is a diagram of an exemplary embodiment of a node of a neural network.

Referring now to FIG. 6, an exemplary embodiment of a node 600 of a neural network is illustrated. A node may include, without limitation a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0, x)$, a "leaky" and/or "parametric" rectified linear unit function such as $f(x)=\max(ax, x)$ for some a, an exponential linear units function such as $$f(x) = \begin{cases} x \text{ for } x \geq 0 \\ \alpha(e^x - 1) \text{ for } x < 0 \end{cases}$$

for some value of α (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x*\text{sigmoid}(x)$, a Gaussian error linear unit function such as $f(x)=a(1+\tanh(\sqrt{2/\pi}(x+bx^r)))$ for some values of a, b, and r, and/or a scaled exponential linear unit function such as $$f(x) = \lambda\begin{cases} \alpha(e^x - 1) \text{ for } x < 0 \\ x \text{ for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$, or of other coefficients and/or parameters of an activation function, may be determined by training a neural network using training data, which may be performed using any suitable process as described above. Each weight in a neural network may, without limitation, be updated and/or tuned, based on an error function J, using a backpropagation updating method, such as:

$$w_{new} = w_{old} - \alpha\frac{dJ}{dw}$$

where $w_{new}$ is the updated weight value, $w_{old}$ is the previous weight value, α is a parameter to set the learning rate, and dj/dw is the partial derivative of with respect to weight w.

Figure 7:
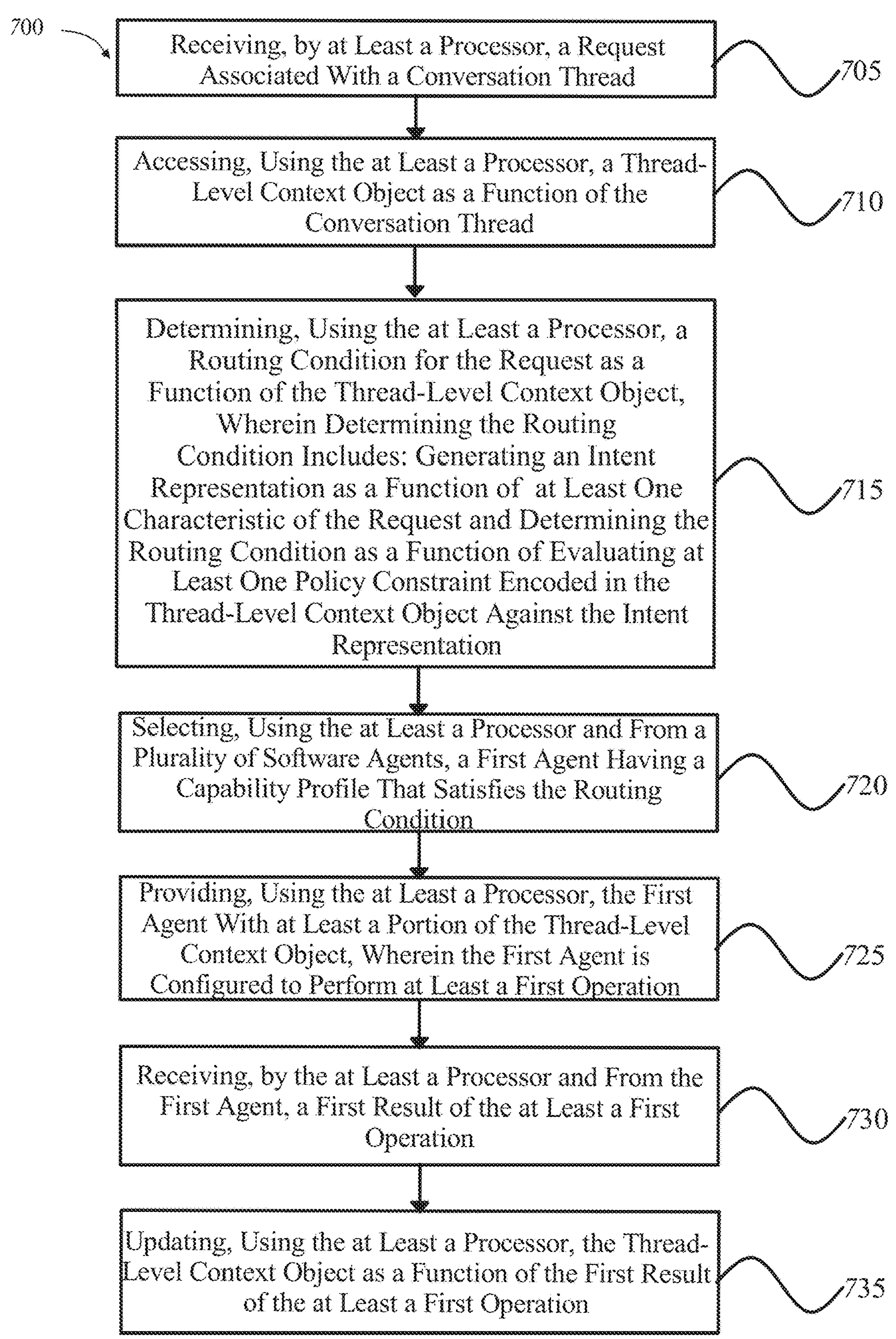
FIG. 7 is a flow diagram of an exemplary method of context-preserving agent routing with thread-level context serialization.

Referring now to FIG. 7, a flow diagram of an exemplary method 700 of context-preserving agent routing with thread-level context serialization is illustrated. Method 700 may include a step 705 of receiving, by at least a processor, a request associated with a conversation thread. In an embodiment, receiving the request associated with the conversation thread may include: monitoring the conversation thread for one or more user inputs, detecting, from the one or more user inputs, the request, wherein the request corresponds to a conversational instruction, and extracting the request for routing to the first agent. This may be implemented, without limitation, as referenced in relation to FIGS. 1-6.

In continued reference to FIG. 7, method 700 may include a step 710 of accessing, using the at least a processor, a thread-level context object as a function of the conversation thread. In an embodiment, accessing the thread-level context object may include identifying a context object as a function of an identifier of the conversation thread. In an embodiment, the thread-level context object may be stored in a serialized format for persistence across multiple operations performed within the conversation thread. This may be implemented, without limitation, as referenced in relation to FIGS. 1-6.

With further reference to FIG. 7, method 700 may include a step 715 of determining, using the at least a processor, an intent and a routing condition for the request as a function of the thread-level context object, wherein determining the intent and the routing condition of the request includes: generating an intent representation as a function of at least one characteristic of the request and determining the routing condition as a function of evaluating at least one policy constraint encoded in the thread-level context object against the intent representation. This may be implemented, without limitation, as referenced in relation to FIGS. 1-6.

Still referring to FIG. 7, method 700 may include a step 720 of selecting, using the at least a processor and from a plurality of software agents, a first agent having a capability profile that satisfies the routing condition. In an embodiment, the plurality of software agents may be stored in an agent registry, wherein the agent registry stores, for each software agent of the plurality of software agents, a capability manifest and selecting the first agent may include identifying, as a function of the routing condition, the capability manifest that satisfies the routing condition. This may be implemented, without limitation, as referenced in relation to FIGS. 1-6.

With continued reference to FIG. 7, method 700 may include a step 725 of providing, using the at least a processor, the first agent with at least a portion of the thread-level context object, wherein the first agent is configured to perform at least a first operation as a function of the request. In an embodiment, providing the first agent with the at least a portion of the thread-level context object may include generating a filtered subset of the thread-level context object as a function of one or more access limitations associated with the first agent. This may be implemented, without limitation, as referenced in relation to FIGS. 1-6.

In further reference to FIG. 7, method 700 may include a step 730 of receiving, by at least the processor and from the first agent, a first result of the at least a first operation. This may be implemented, without limitation, as referenced in relation to FIGS. 1-6.

Still referring to FIG. 7, method 700 may include a step 735 of updating, using the at least a processor, the thread-level context object as a function of the first result of the at least a first operation. This may be implemented, without limitation, as referenced in relation to FIGS. 1-6.

With further reference to FIG. 7, method 700 may further include determining, using the at least a processor and as a function of the updated thread-level context object, a subsequent routing condition, wherein the subsequent routing condition specifies a subsequent operation and a target agent to which the subsequent operation is to be routed and providing, using the at least a processor and as a function of the subsequent routing condition, at least a portion of the updated thread-level context object to the target agent specified in the subsequent routing condition. This may be implemented, without limitation, as referenced in relation to FIGS. 1-6.

In continued reference to FIG. 7, in an embodiment, the plurality of software agents may include at least a second agent and method 700 may further include routing, using the at least a processor, a task generated by the first agent to the at least a second agent as a function of the thread-level context object. In an embodiment, tasks generated by the first agent and the at least a second agent form a hierarchical task chain and method 700 may further include routing, using the at least a processor, the tasks within the hierarchical task chain as a function of the thread-level context object. This may be implemented, without limitation, as referenced in relation to FIGS. 1-6.

Still referring to FIG. 7, method 700 may include generating, using the at least a processor, an audit log comprising entries indicating at least one of: a selected agent, an operation routed to the selected agent, and an update to the thread-level context object. This may be implemented, without limitation, as referenced in relation to FIGS. 1-6.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
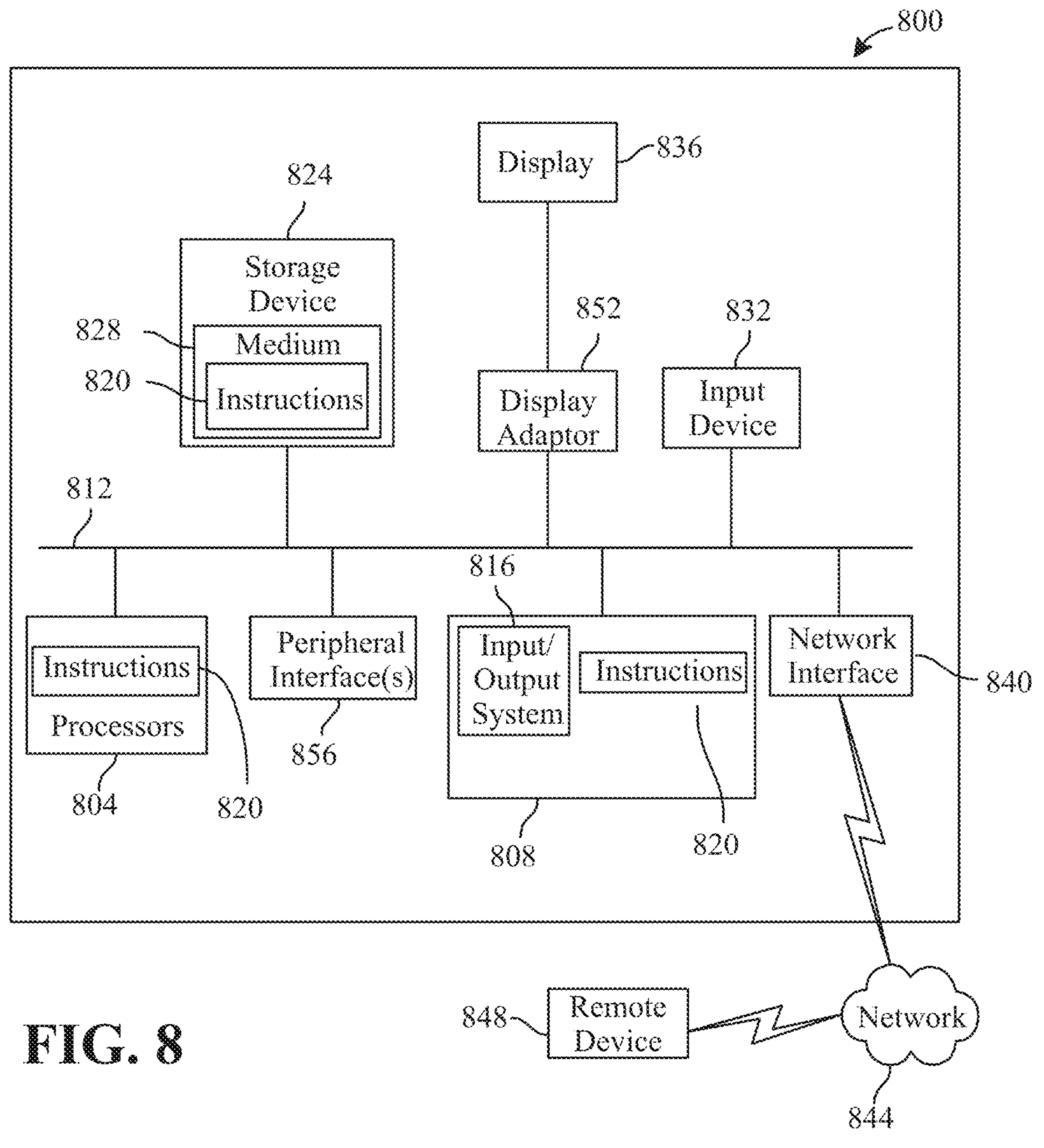
FIG. 8 is a block diagram of a computing system that can be used to implement any one or more of the methodologies disclosed herein and any one or more portions thereof.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC). Each processor and/or processor core may perform a state transition, instruction, and/or instruction step during a period of a "clock," or a regular oscillator that generates periodic output waveform, such as a square wave, having a regular period; different processors and/or cores may have distinct clocks. A processor may operate as and/or include a processing unit that performs instruction inputs, arithmetic operations, logical operations, memory retrieval operations, memory allocation operations, and/or input and output operations; a control circuit or module within a processor may determine which of the above-described functions a processor and/or unit within a processor will perform on a given clock cycle. A processor may include a plurality of processing units or "cores," each of which performs the above-described actions; multiple cores may work on disparate instruction sets and/or may work in parallel. A single core may also include multiple arithmetic, logic, or other units that can work in parallel with each other. Parallel computing between and/or within processors and/or cores may include multithreading processes and/or protocols such as without limitation Tomasulo's algorithm. As used in this disclosure, "a processor," and/or "configuring a processor," is equivalent for the purposes of this disclosure to at least a processor, a plurality of processors, and/or a plurality of processor cores, and/or programming at least a processor, a plurality of processors, and/or a plurality of processor cores, which may be configured to operate on instructions in parallel and/or sequentially according to multithreading algorithms, parallel computing, load and/or task balancing, and/or virtualization, for instance and without limitation as described below.

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof. Memory 808 may include a primary memory and a secondary memory. "Primary memory," which may be implemented, without limitation as "random access memory" (RAM), is memory used for temporarily storing data for active use by a processor. In one or more embodiments, during use of the computing device, instructions and/or information may be transmitted to primary memory wherein information may be processed. In one or more embodiments, information may only be populated within primary memory while a particular software is running. In one or more embodiments, information within primary memory is wiped and/or removed after the computing device has been turned off and/or use of a software has been terminated. In one or more embodiments, primary memory may be referred to as "Volatile memory" wherein the volatile memory only holds information while data is being used and/or processed. In one or more embodiments, volatile memory may lose information after a loss of power.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In some embodiments, storage device 824 and/or devices "Secondary memory" also known as "storage," "hard disk drive" and the like for the purposes of this disclosure is a long-term storage device in which an operating system and other information is stored; operating system and/or main program instructions may alternatively or additionally be stored in hard-coded memory ROM, or the like. In one or remote embodiments, information may be retrieved from secondary memory and copied to primary memory during use. In one or more embodiments, secondary memory may be referred to as non-volatile memory wherein information is preserved even during a loss of power. In some embodiments, data from secondary memory is transferred to primary memory before being accessed by a processor. In one or more embodiments, data is transferred from secondary to primary memory wherein circuitry may access the information from primary memory. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIREWIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display 836. Examples of a display device include, but are not limited to, a liquid crystal display (LCD), a cathode ray tube (CRT), a plasma display, a light emitting diode (LED) display, and any combinations thereof. Display adapter 852 and display 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

Further referring to FIG. 8, a computing device may include any computing device as described in this disclosure, including without limitation a microcontroller, microprocessor, digital signal processor (DSP) and/or system on a chip (SoC) as described in this disclosure. A computing device may include, be included in, and/or communicate with a mobile device such as a mobile telephone or smartphone. A computing device may include a single device having components as described above operating independently, or may include two or more such devices and/or components thereof operating in concert, in parallel, sequentially or the like; two or more devices, processors, memory elements, and the like may be included together in a single computing device or in two or more computing devices. A computing device may interface or communicate with one or more additional devices as described below in further detail via a network interface device.

In some embodiments, and still referring to FIG. 8, a computing device may be a component of a combination of at least a computing device; at least a computing device may include, as a non-limiting example, a first computing device or cluster of computing devices in a first location and a second computing device or cluster of computing devices in a second location. At least a computing device may include one or more computing devices dedicated to data storage, security, distribution of traffic for load balancing, and the like. At least a computing device may distribute one or more computing tasks as described below across a plurality of computing devices of computing device, which may operate in parallel, in series, redundantly, or in any other manner used for distribution of tasks or memory between computing devices. At least a computing device may be implemented, as a non-limiting example, using a "shared nothing" architecture.

With continued reference to FIG. 8, one or more programs or software instructions may include a principal program and/or operating system; principal program and/or operating system may be a program that runs automatically upon startup of a computing device and manages computer hardware and software resources. Principal program and/or operating system may include "startup," "loop," and/or "main" programs on a microcontroller; such programs may initialize hardware resources and subsequently iterate through a series of instructions to make function calls, read in data at input ports, output data at output ports, and process interrupts caused by asynchronous data inputs or the like. Principal program and/or operating system may include, without limitation, an operating system, which may schedule program tasks to be implemented by one or more processors, act as an intermediary between one or more programs and inputs, outputs, hardware and/or memory. Examples of operating systems include without limitation Unix, Linux, Microsoft Windows, Android, Disc Operating System (DOS) and the like. Operating systems may include, without limitation, multi-computer operating systems that run across multiple computing devices, real-time operating systems, and hypervisors. A "hypervisor," as used in this disclosure, is an operating system that runs a virtual machine and/or container, where virtual machines and/or containers create virtual interfaces for programs that mimic the behavior of hardware elements such as processors and/or memory; interactions with such virtual interfaces appear, to programs executed on virtual machines, to function as interactions with physical hardware, while in reality the hypervisor and/or programs such as containers (1) receive inputs from programs to the virtual resources and allocate such inputs to physical hardware that is not directly accessible to the programs, and (2) receive outputs from physical hardware and transmit such outputs to the programs in the form of apparent outputs from the virtual hardware. In some cases, one or more of computing system 800, processor 804, and memory 808 may be virtualized; that is, a virtual machine and/or container may interact directly with such computing system 800, processor 804, and/or memory 808, while managing communications therefrom and thereto via a virtual interface with programs. Computer virtualization may include dividing, or augmenting computing resources into a virtual machine, operating system, processor, and/or container. Virtualization of computer resources may be implemented through use of (1) multiple components, or portions thereof, working in concert, as if they were one unified (virtual) component; and/or (2) a portion of one or more components working as though it were a complete (virtual) component. For instance, where processor 804 comprises a plurality of processors and/or processor cores, virtualization may, in some cases, simulate or emulate a single (virtual) processor whose functions are allocated to one or more of the plurality of processors and/or processor cores. In this case, while processor 804 may be said to be virtualized, the processor 804, nevertheless, comprises actual hardware processor(s) or portion(s) thereof. Accordingly, in this disclosure, where a processor is said to perform instructions, such processor may comprise a virtualized processor, comprising a plurality or portion of hardware processors. Likewise, in this disclosure, where a memory is said to contain (i.e., store) instructions, such memory may comprise a virtualized memory, comprising a plurality or portion of memories. Technologies that enable such virtualization include (1) QEMU, www.qemu.org; (2) VMware by Broadcom Inc of Palo Alto, California; (3) VirtualBox by Oracle Corporation headquartered in Austin, Texas; and (4) kernel-based virtual machine (KVM) www.linux-kvm.org.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for context-preserving agent routing with thread-level context serialization, the system comprising:

at least a processor; and a memory communicatively connected to the at least a processor, wherein the memory contains instructions configuring the at least a processor to:

receive a request associated with a conversation thread;

access a thread-level context object as a function of the conversation thread, wherein:

the thread-level context object comprises a serialized representation of conversational state associated with the conversation thread; and the thread-level context object is persistently associated with the conversation thread;

determine a routing condition for the request as a function of the thread-level context object, wherein determining the routing condition of the request comprises:

generating an intent representation as a function of at least one characteristic of the request; and determining the routing condition as a function of evaluating at least one policy constraint encoded in the thread-level context object against the intent representation;

select, from a plurality of software agents, a first agent having a capability profile that satisfies the routing condition;

provide the first agent with at least a portion of the thread-level context object, wherein:

the first agent is configured to perform at least a first operation as a function of the request; and the thread-level context object is shared across the plurality of software agents such that each of the plurality of software agents accesses a common context representation associated with the conversation thread;

receive, from the first agent, a first result of the at least a first operation; and update the thread-level context object as a function of the first result of the at least a first operation, wherein updating the thread-level context object comprises modifying the serialized representation as a function of one or more outputs from one or more of the plurality of software agents for use in determining a subsequent routing condition for a subsequent request associated with the conversation thread.

2. The system of claim 1, wherein receiving the request associated with the conversation thread comprises:

monitoring the conversation thread for one or more user inputs;

detecting, from the one or more user inputs, the request, wherein the request corresponds to a conversational instruction; and extracting the request for routing to the first agent.

3. The system of claim 1, wherein accessing the thread-level context object comprises identifying the thread-level context object as a function of an identifier of the conversation thread.

4. The system of claim 1, wherein:

the plurality of software agents is stored in an agent registry, wherein the agent registry stores, for each software agent of the plurality of software agents, a capability manifest; and selecting the first agent comprises identifying, as a function of the routing condition, the capability manifest that satisfies the routing condition.

5. The system of claim 1, wherein providing the first agent with the at least a portion of the thread-level context object comprises generating a filtered subset of the thread-level context object as a function of one or more access limitations associated with the first agent.

6. The system of claim 1, wherein the at least a processor is further configured to:

determine, as a function of the updated thread-level context object, a subsequent routing condition, wherein the subsequent routing condition specifies a subsequent operation and a target agent to which the subsequent operation is to be routed; and provide, as a function of the subsequent routing condition, at least a portion of the updated thread-level context object to the target agent specified in the subsequent routing condition.

7. The system of claim 1, wherein:

the plurality of software agents comprises at least a second agent; and the at least a processor is further configured to route a task generated by the first agent to the at least a second agent as a function of the thread-level context object.

8. The system of claim 7 wherein:

tasks generated by the first agent and the at least a second agent form a hierarchical task chain; and the at least a processor is further configured to route the tasks within the hierarchical task chain as a function of the thread-level context object.

9. The system of claim 1, wherein the at least a processor is further configured to generate an audit log comprising entries indicating at least one of:

a selected agent;

an operation routed to the selected agent; and an update to the thread-level context object.

10. A method of context-preserving agent routing with thread-level context serialization, the method comprising:

receiving, by at least a processor, a request associated with a conversation thread;

accessing, using the at least a processor, a thread-level context object as a function of the conversation thread, wherein:

the thread-level context object comprises a serialized representation of conversational state associated with the conversation thread; and the thread-level context object is persistently associated with the conversation thread;

determining, using the at least a processor, a routing condition for the request as a function of the thread-level context object, wherein determining the routing condition of the request comprises:

generating an intent representation as a function of at least one characteristic of the request; and determining the routing condition as a function of evaluating at least one policy constraint encoded in the thread-level context object against the intent representation;

selecting, using the at least a processor and from a plurality of software agents, a first agent having a capability profile that satisfies the routing condition;

providing, using the at least a processor, the first agent with at least a portion of the thread-level context object, wherein:

the first agent is configured to perform at least a first operation as a function of the request; and the thread-level context object is shared across the plurality of software agents such that each of the plurality of software agents accesses a common context representation associated with the conversation thread:

receiving, by at least the processor and from the first agent, a first result of the at least a first operation; and updating, using the at least a processor, the thread-level context object as a function of the first result of the at least a first operation, wherein updating the thread-level context object comprises modifying the serialized representation as a function of one or more outputs from one or more of the plurality of software agents for use in determining a subsequent routing condition for a subsequent request associated with the conversation thread.

11. The method of claim 10, wherein receiving the request associated with the conversation thread comprises:

monitoring the conversation thread for one or more user inputs;

detecting, from the one or more user inputs, the request, wherein the request corresponds to a conversational instruction; and extracting the request for routing to the first agent.

12. The method of claim 10, wherein accessing the thread-level context object comprises identifying a context object as a function of an identifier of the conversation thread.

13. The method of claim 10, wherein:

the plurality of software agents is stored in an agent registry, wherein the agent registry stores, for each software agent of the plurality of software agents, a capability manifest; and selecting the first agent comprises identifying, as a function of the routing condition, the capability manifest that satisfies the routing condition.

14. The method of claim 10, wherein providing the first agent with the at least a portion of the thread-level context object comprises generating a filtered subset of the thread-level context object as a function of one or more access limitations associated with the first agent.

15. The method of claim 10, further comprising:

determining, using the at least a processor and as a function of the updated thread-level context object, a subsequent routing condition, wherein the subsequent routing condition specifies a subsequent operation and a target agent to which the subsequent operation is to be routed; and providing, using the at least a processor and as a function of the subsequent routing condition, at least a portion of the updated thread-level context object to the target agent specified in the subsequent routing condition.

16. The method of claim 10, wherein:

the plurality of software agents comprises at least a second agent; and the method further comprises routing, using the at least a processor, a task generated by the first agent to the at least a second agent as a function of the thread-level context object.

17. The method of claim 16, wherein:

tasks generated by the first agent and the at least a second agent form a hierarchical task chain; and the method further comprises routing, using the at least a processor, the tasks within the hierarchical task chain as a function of the thread-level context object.

18. The method of claim 10, further comprising generating, using the at least a processor, an audit log comprising entries indicating at least one of:

a selected agent;

an operation routed to the selected agent; and an update to the thread-level context object.

* * * * *